United States Patent
He et al.

(10) Patent No.: US 8,032,782 B2
(45) Date of Patent: Oct. 4, 2011

(54) SYSTEM, METHOD, AND SERVICE FOR PROVIDING A GENERIC RAID ENGINE AND OPTIMIZER

(75) Inventors: Dingshan He, Bellevue, WA (US); Deepak R. Kenchammana Hosekote, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/133,224

(22) Filed: Jun. 4, 2008

(65) Prior Publication Data
US 2008/0256427 A1    Oct. 16, 2008

Related U.S. Application Data

(63) Continuation of application No. 11/669,464, filed on Jan. 31, 2007, now abandoned.

(51) Int. Cl.
*G06F 11/00* (2006.01)
(52) U.S. Cl. .......................... 714/6.1; 711/114
(58) Field of Classification Search .............. 714/6.1, 714/6.11, 6.12, 6.13, 6.2, 6.21, 6.22, 6.23, 714/6.24, 6.3, 6.31, 6.32, 10, 11–13, 718, 714/800, 805; 711/114, 100
See application file for complete search history.

(56) References Cited

U.S. PATENT DOCUMENTS

| | | | |
|---|---|---|---|
| 5,392,244 A | | 2/1995 | Jacobson et al. |
| 5,557,769 A * | | 9/1996 | Bailey et al. ............ 711/146 |
| 5,572,661 A * | | 11/1996 | Jacobson ............ 714/6.32 |
| 5,677,890 A * | | 10/1997 | Liong et al. ............ 365/229 |
| 5,701,432 A * | | 12/1997 | Wong et al. ............ 711/130 |
| 5,758,187 A | | 5/1998 | Young |
| 5,892,969 A | | 4/1999 | Young |
| 6,289,398 B1 * | | 9/2001 | Stallmo et al. ............ 710/5 |
| 6,460,122 B1 | | 10/2002 | Otterness et al. |
| 6,567,911 B1 * | | 5/2003 | Mahmoud ............ 713/2 |
| 6,651,165 B1 | | 11/2003 | Johnson |
| 6,851,023 B2 * | | 2/2005 | Noya et al. ............ 711/114 |
| 6,898,667 B2 | | 5/2005 | Umberger et al. |
| 7,062,605 B2 | | 6/2006 | Chatterjee et al. |
| 2006/0095661 A1 | | 5/2006 | Fleiner et al. |
| 2006/0167838 A1 | | 7/2006 | Lacapra |

OTHER PUBLICATIONS

Notice of Allowance from U.S. Appl. No. 11/669,464 dated May 13, 2009.

* cited by examiner

*Primary Examiner* — Dieu-Minh Le
(74) *Attorney, Agent, or Firm* — Shimokaji & Associates, P.C.

(57) ABSTRACT

A generic RAID engine system accepts an access request, accepts a metadata input comprising a layout description and, optionally, a plurality of resource optimization objectives, accepts a dynamic input comprising a dynamic state of an I/O stack comprising the generic RAID engine and a fault configuration of a plurality of storage devices in the I/O stack, and accepts RAID code input comprising information about the RAID code used by the I/O stack. The metadata input, the dynamic input, and the RAID code input are utilized to transform the access request into individual device reads and individual device writes such that RAID code relationships for the storage devices are maintained at all times. An optional optimizer module selects strategies that meet the resource optimization objectives.

13 Claims, 15 Drawing Sheets

| E1 440 | E2 445 | E3 450 | E4 455 | E5 460 | E6 465 | P1 470 | P2 475 | Q1 480 | Q2 485 |
|---|---|---|---|---|---|---|---|---|---|
| 1 | 0 | 0 | 0 | 0 | 0 | 1 | 0 | 1 | 0 |
| 0 | 1 | 0 | 0 | 0 | 0 | 0 | 1 | 0 | 1 |
| 0 | 0 | 1 | 0 | 0 | 0 | 1 | 0 | 0 | 1 |
| 0 | 0 | 0 | 1 | 0 | 0 | 0 | 1 | 1 | 1 |
| 0 | 0 | 0 | 0 | 1 | 0 | 1 | 0 | 1 | 1 |
| 0 | 0 | 0 | 0 | 0 | 1 | 0 | 1 | 1 | 0 |

| D1 415 | D2 420 | D4 425 | D4 430 | D5 435 |
|---|---|---|---|---|
| E1 440 | E3 450 | E5 460 | P1 470 | Q1 480 |
| E2 445 | E4 455 | E6 465 | P2 475 | Q2 485 |

SYSTEM, METHOD, AND SERVICE FOR PROVIDING A GENERIC RAID ENGINE AND OPTIMIZER

FIELD OF THE INVENTION

The present invention generally relates to data storage. More specifically, the present invention relates to providing fault tolerance for a storage system comprising RAID coded storage volumes.

BACKGROUND OF THE INVENTION

Conventional applications requiring reliable data storage typically use commonly available RAID (redundant array of independent disks) levels to protect against data loss due to media or disk failures. Although conventional RAID technology has proven to be useful, it would be desirable to present additional improvements. With a marked rise in the quantity of stored data and no commensurate improvement in disk reliability, a variety of RAID codes are becoming essential to containing data management costs. However, rolling out new RAID codes is challenging as well as cost prohibitive since the new RAID codes require significant development, testing, and tuning efforts.

Until recently, protecting customer data from loss due to media failure and/or device failures meant storing the using one of a basic set of RAID codes representing various levels of data protection and storage performance. To handle higher performance and reliability needs of customers, storage vendors deployed additional codes (e.g., RAID 51) as variations on that basic set. These additional codes were primarily offered as a result of juggling the inherent risk-reward trade-off from a software engineering standpoint as opposed to improving storage efficiency or performance. These additional codes can be composed by reusing (e.g., hierarchically) the basic RAID set, thus minimizing the amount of additional source code introduced. Consequently, product-marketing needs were satisfied with a low testing expense.

Only a few RAID codes were supported in traditional RAID implementations (firmware) for a variety of reasons: firmware complexity, software maintainability, and field upgrade difficulty. Firmware complexity, as measured by the number of paths that need to be tested, grows with every supported RAID code. Increased complexity increases development and test costs. The firmware becomes a collection of special cases making it hard to perform path length optimizations. In addition, performance tuning becomes difficult, if not prohibitively expensive.

From a software maintainability standpoint, a collection of "if . . . then . . . else . . . " code blocks makes firmware readability harder, making the firmware more prone to bugs. Each rollout of a RAID code requires field upgrades. Upgrading firmware and drivers is not a task that a storage administrator relishes, given the propensity of upgrades to trigger other problems.

Since deploying firmware changes is painful, there is a general mindset to avoid it all costs. However, recent trends in storage technology and customer focus are forcing a re-evaluation of this status quo because of a need for supporting a variety of RAID codes in a system, growth in reference data, a growing popularity of modular systems, and a growing use of low cost serial disks to build high performance systems.

No single RAID code satisfies all aspects of data storage. In a world where the volume of customer data is rising due to various reasons from business transformation to regulatory requirements, it is becoming increasing important to store data at levels of reliability, performance and efficiency that are proportional to the "business" value of the data. Information life-cycle management (ILM) is becoming crucial to cost containment. Supporting a variety of RAID codes thus becomes integral to effective information life-cycle management.

The additive nature of reference data in organizations implies that the same storage manages a wide variety of scales of data sets from gigabytes to petabytes at the same reliability level. Using a single RAID code in this application is challenging. These datasets typically span many disks, indicating a relatively high probability of simultaneous failures. Furthermore, while disk capacities are increasing, the hard error rate (HER) due to media deterioration, channel errors, etc., has remains relatively constant. Combined, these trends raise the frequency of data loss events as data sets grow unless RAID codes with a higher fault tolerance are used.

The use of modular (or brick) systems to build storage systems that scale capacity, reliability and performance simultaneously is a trend that is gaining popularity. Many of these systems embrace deferred maintenance to reduce the cost of managing such systems. In a "fail in place" service strategy, software isolates failed components and rebuilds stored data on surviving bricks. As long as there is sufficient spare capacity, replacement of failed components can be deferred to bi-annual or multi-year cycles.

A further trend is the growing use of low cost serial ATA (SATA) disks to build high performance systems. SATA disks have hard error rates that are 10 times higher than comparable SCSI disks while costing about 35-55% less. Consequently, providing various data reliability levels using cheaper but less reliable disks requires a greater variety of RAID codes.

One conventional approach, RAIDframe, focuses on providing firmware environments that permit rapid prototyping and evaluation of redundant disk array architectures. Although this approach has proven to be useful, it would be desirable to present additional improvements. This approach modularizes the basic functions that differentiate RAID architectures: mapping, encoding, and caching. This modularization allows each aspect to be modified independently, creating new designs. In RAIDframe, array operations are modeled as directed acyclic graphs (DAGs) that specify the architectural dependencies (and execution) between primitives. RAIDframe provides no simplification or automation of error handling. Furthermore, RAIDframe has no ability to automatically tune performance.

Other conventional approaches utilize a RAID system-on-a-chip (SOC) product. Although these approaches have proven to be useful, it would be desirable to present additional improvements. For example, one such approach contains an embedded processor, DMA/XOR engines, and host and disk interface logic (FC and SATA). Since the processor is programmable, it is conceivable that this approach may support a variety of RAID codes. However, all error paths are specified as callbacks written by the developer. Further, tuning of this performance approach is only minimally automatic, if at all.

What is therefore needed is a solution to provide a variety of RAID codes without compromising the quality, performance, and maintainability of the firmware. Such a method allows for adding new RAID codes without bloating the firmware. Many RAID codes have been proposed such as, for example, EVENODD, generalized EVENODD, X-code, RDP, and WEAVER. A common trend in these RAID codes is to focus on XOR-based RAID codes since they can be efficiently implemented in hardware or software. Non-XOR codes such as LDPC and Reed-Solomon have been developed, but these have not become popular since they offer no special advantage over XOR based codes.

A solution is required to automatically handle any RAID code related error. An example of such an error path is, on a read, encountering a read error due to a failed sector or disk. Since error handling is a large fraction of a firmware, the solution should unify fault-free and fault-ridden cases into common code paths.

The solution is further required to simplify nested error paths inherent in firmware. An example of a nested error path is when, in the process of reconstructing a lost block due to a previous failure, a new sector or disk failure is discovered. If the RAID code encounters such nested error paths, the solution is required to automatically determine how to reconstruct the lost block.

Furthermore, the solution is required to automatically tune performance for every I/O operation performed by leveraging: dynamic state such as currently cached pages.

What is therefore needed is a system, a service, a computer program product, and an associated method for providing a generic RAID engine and optimizer. Such a system should work for any XOR-based erasure (RAID) code and under any combination of sector or disk failures. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for providing a generic RAID engine and optimizer.

The present system accepts an access request, accepts a metadata input comprising a layout description and, optionally, a plurality of resource optimization objectives, accepts a dynamic input comprising a dynamic state of an I/O stack comprising the generic RAID engine and a fault configuration of a plurality of storage devices in the I/O stack, and accepts RAID code input comprising information about the RAID code used by the I/O stack. The present system utilizes the metadata input, the dynamic input, and the RAID code input to transform the access request into individual device reads and individual device writes such that RAID code relationships for the storage devices are maintained at all times. An optional optimizer module of the present system selects strategies that meet the resource optimization objectives.

The layout description comprises a description of a rotation, a stripe size, and an element size of each of a plurality of disks in the storage devices.

The resource optimization objectives comprise minimizing disk I/O and minimizing memory bus bandwidth for the access request.

The dynamic input comprises a description of a data cache of the I/O stack regarding a description of clean pages in the data cache, a description of dirty pages in the data cache, the clean pages and the dirty pages being in a W-neighborhood of a page to be any of read and written.

The fault configuration-comprises a description of known sector failures and a plurality of known disk failures.

Transforming a write request comprises-constructing a plurality of affected parity vectors, preparing a failure vector appropriate to the degraded layout, computing a plurality of inverse matrices, and generating a plurality of sub-plans by combining individual vectors. Transforming a write request further comprises reblocking (according to the generator matrix for the RAID code) the read and write vectors and generating a write I/O plan comprising the matrices for performing individual device read and writes.

Transforming a read request comprises determining if any faults exist in the disks of the storage system that prevent a successful read. If faults exist, the present system zeroes column components in the generator matrix corresponding to the failed elements and computes its pseudo-inverse, translates this matrix for consideration to device reads, reblocks (as in the generator matrix for the RAID code) and generates a read I/O plan for performing individual device reads.

Transforming the access request further comprises any of executing a scrub, executing a rebuild, and executing a migrate.

The present system may be embodied in a utility program such as a generic RAID engine utility program. The present system also provides a method for the user to specifying: input comprising metadata input, RAID code input, and dynamic input and then invoking the generic RAID code engine utility to execute read requests: and write requests. The metadata input comprises disk layout information such as rotation, stripe size, element size, etc. The metadata input optionally comprises optimization criteria such as, for example, minimizing disk I/O or minimizing bus bandwidth. The dynamic input comprises information regarding a data cache such as a description of clean pages and dirty pages in a W-neighborhood of pages to be read or written. The dynamic input further comprises a current fault configuration comprising a description of known sector failures and disk failures. The RAID code input comprises a concise description of the RAID code.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is comprised of FIGS. 4A and 4B and represents a diagram illustrating an exemplary stripe of a device utilizing an EVENODD code and a corresponding generator matrix of the stripe generated by of the generic RAID engine system of FIGS. 1 and 2;

DETAILED DESCRIPTION OF PREFERRED EMBODIMENTS

The following definitions and explanations provide background information pertaining to the technical field of the present invention, and are intended to facilitate the understanding of the present invention without limiting its scope:

Element (interchangeably referenced as a page): fixed-size chunks of bits. An element typically comprises one or more consecutive pages on a disk and comprises data pages or parity pages but not both parity pages and data pages.

Page (interchangeably referenced as an element): fixed-size chunks of bits

RAID (Redundant Array of Independent Disks): Any of a family of codes using XOR codes to achieve a virtual erasure coded storage volume. Examples of RAID codes comprise RAID 5, EVENODD, generalized EVENODD, X-code, RDP, and WEAVER.

Strategy: a sub-plan used by the present invention to develop an I/O plan based on metadata input, RAID code input, dynamic input, and one or more read requests or one or more write requests.

Stripe: the set of data elements and all related parity elements. The number of elements that a stripe comprises depends on the number of disks in the storage system and the coding scheme.

Figure 1:
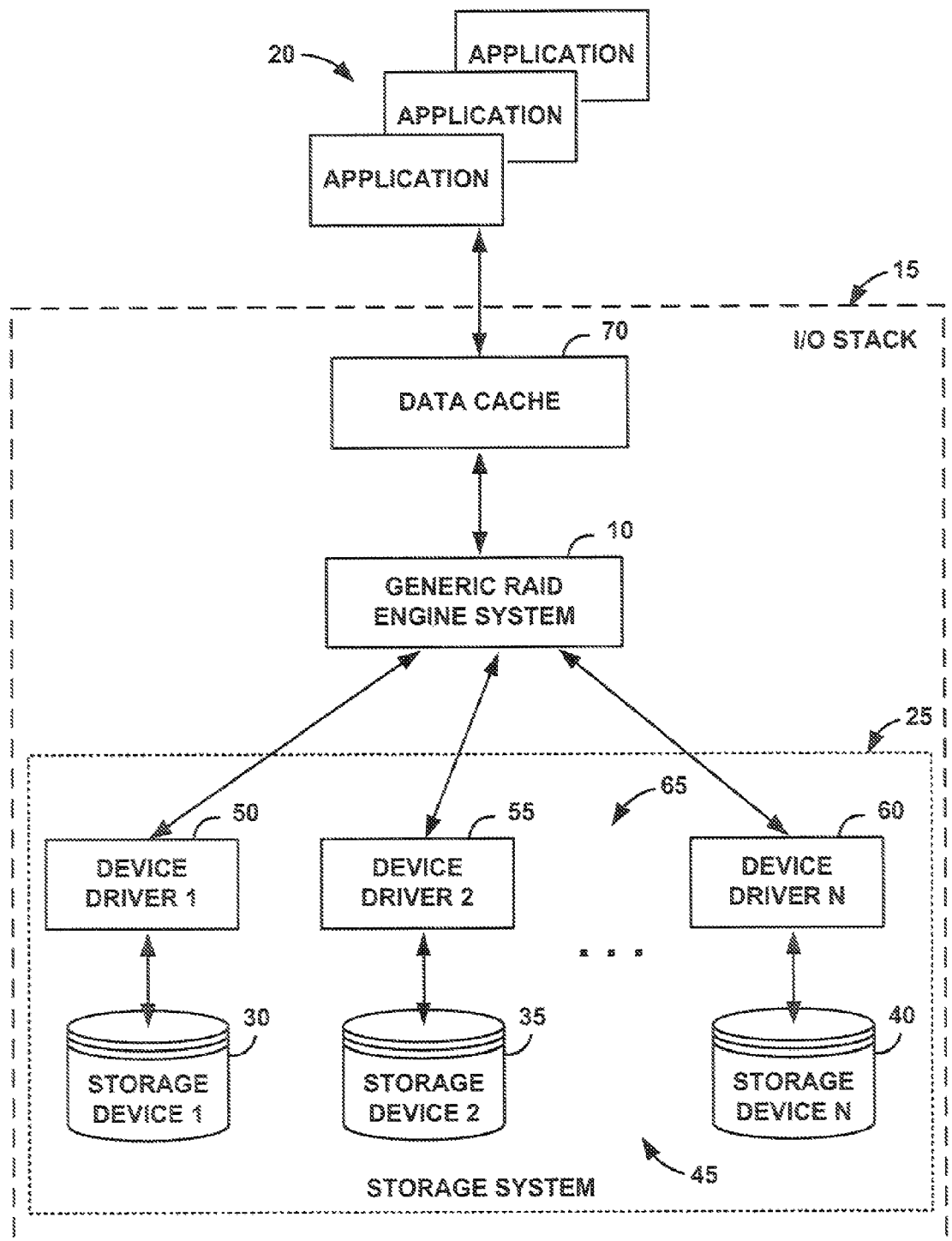
FIG. 1 is a schematic illustration of an exemplary operating environment in which a generic RAID engine system of the present invention can be used.

FIG. 1 portrays an exemplary overall environment in which a system, a service, a computer program product, and an associated method (the generic RAID engine system 10 or the "System 10") for providing a generic RAID engine and optimizer according to the present invention may be used. System 10 comprises a software programming code or a computer program product that is typically embedded within, or installed on an I/O stack 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In a preferred embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 10. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk, and an optical disk. Current examples of optical disks comprise compact disk—read only memory (CD-ROM), compact disk—read/write (CD-R/W), and DVD.

A data processing system suitable for storing and/or executing program code comprises at least one processor coupled directly or indirectly to memory elements through a system bus. The memory elements comprise local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 1 illustrates a high-level diagram of a typical deployment of system 10 within the I/O stack 15. One or more applications 20 generate an access request comprising read or write calls (interchangeably referenced herein as read requests or reads and write requests or writes) to a RAID coded storage volume such as a storage system 25. While described for illustration purposes only as read requests and write requests, the applications 20 may also generate for consideration by system 10 a file read request, a file write request, a block read request, a block write request, etc.

The storage system 25 comprises, for example, a storage device 1, 30, a storage device 2, 35, through a storage device N, 40 (collectively referenced as storage devices 45). A device driver operates each of the storage devices 45. For example, a device driver 1, 50, operates the storage device 1, 30. A device driver 2, 55, operates the storage device 2, 35. A device driver N, 40, operates the storage device N, 40. The device driver 1, 50, the device driver 2, 55, through the device driver N, 60, are collectively referenced as device drivers 65.

The read and write requests are initially served by a data cache 70. System 10 is invoked if a read miss occurs or a page needs to be flushed. System 10 provides generic support of any RAID code under any set of sector or disk failures. System 10 generates disk reads and writes by considering the current (dynamic) state of the data cache 70.

System 10 is invoked by the data cache 70 when reading or writing data to a virtualized erasure coded storage volume such as, for example, RAID 5, EVENODD, etc. Applications 20 generate read and write requests to the I/O stack 15. The read and write requests are serviced by the data cache 70 that manages cached data in pages. With write-back caching, application writes are copied to pages in the data cache 70 and marked dirty. At a later time, as determined by the page replacement policy of the I/O stack 15, dirty pages are flushed (written out) to the storage devices 45. With read caching, application reads are served out of the data cache 70 when possible. Otherwise, on a read miss, the data cache 70 has to fetch the data from the storage devices 45 and then return this data to the applications 20. In one embodiment, the data cache 70 dynamically partitions pages into a write-back portion and a read portion to handle a wide variety of application workloads.

While FIG. 1 illustrates a deployment of system in which locally running applications 20 submit I/Os, is should be clear that system 10 is applicable to a variety of deployments. For example, applications 20 may operate on hosts connected to the I/O stack 15 via a network such as, for example, a storage area network, the Internet, etc., to a (block or file) controller. The data cache 70 and system 10 are deployed within this controller. In many controllers the write-back cache is battery backed to protect content of dirty pages from loss due to unexpected power failure. Other controllers employ a firehose dump to a reserved disk.

Figure 2:
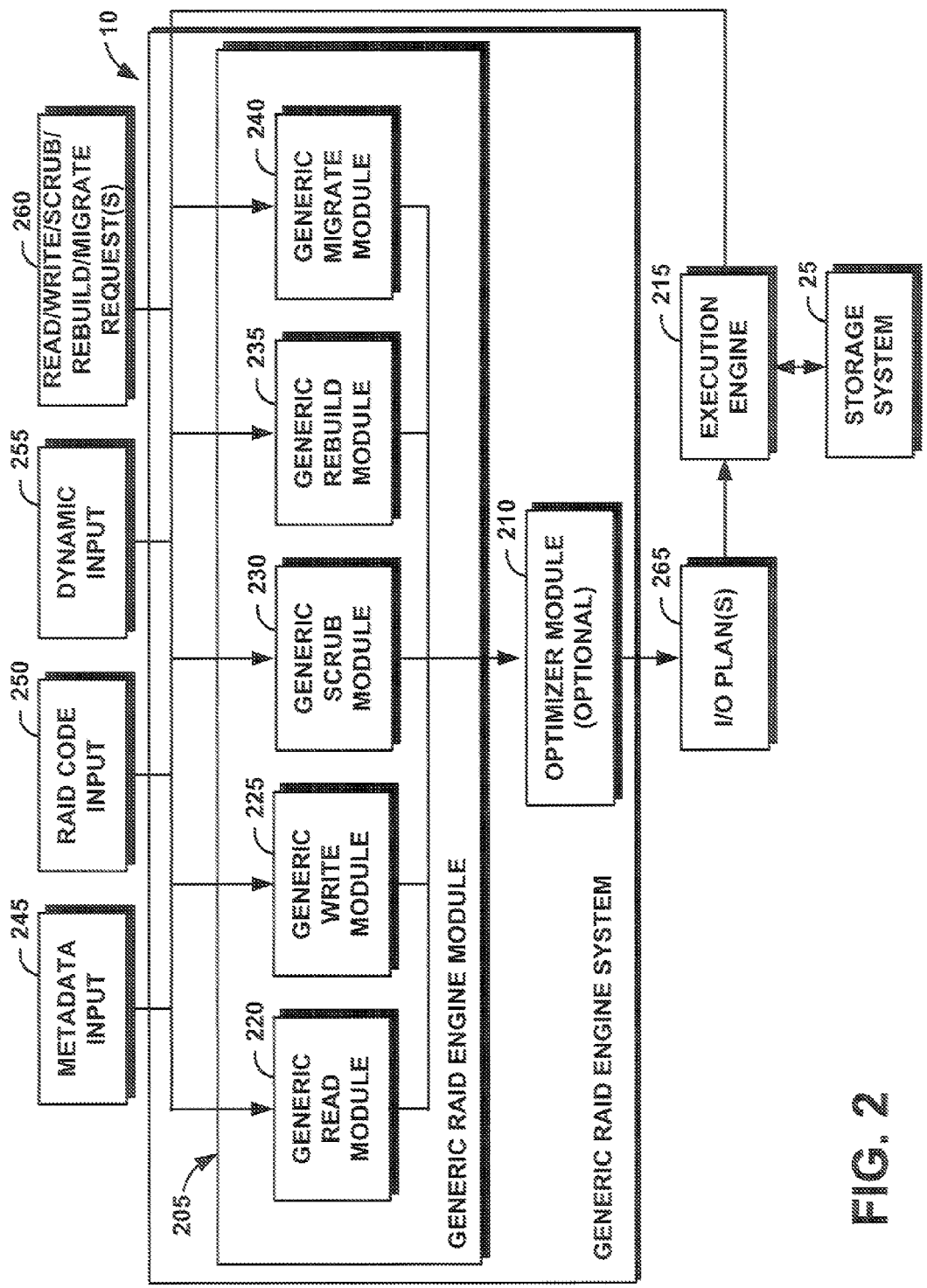
FIG. 2 is a block diagram of the high-level architecture of the generic RAID engine system of FIG. 1.

FIG. 2 illustrates a high-level hierarchy of system 10. System 10 comprises a generic raid engine module 205, an optional optimizer module 210, and an execution engine 215. The generic raid engine module 205 comprises a generic read module 220, a generic write module 225, a generic scrub module 230, a generic rebuild module 235, and a generic migrate module 240. Input to system 10 comprises a metadata input 245, a RAID code input 250, a dynamic input 255, and one or more read/write requests 260 (further referenced herein as access requests 260). The access requests 260 comprises any request for access to the storage devices 25 such as, for example, a read request, a write request, a file read request, a file write request, a block read request, a block write request, etc. System 10 generates as output one or more I/O plans 265. The I/O plans 265 are provided to the execution engine 215 for execution.

The I/O plan 265 comprises a set of pages that are read from the storage system 25, a set of pages that must be XORed, and a set of pages that are written to the storage system 25. Depending on the operation and associated arguments, some of sets of pages in the I/O plan 265 can be empty. The execution engine 215 generates and manages error handling during execution of the I/O plan 265. If the execution engine 215 encounters any errors, the execution engine 215 aborts the I/O plan 265, modifies a fault configuration vector, and re-submits the operations of the I/O plan 265 to the generic RAID engine module 205. The optimizer module 210 selects strategies that meet one or more resource optimization objective(s).

The metadata input 245 comprises a description of the physical arrangement of blocks in the RAID code called the layout, available from the meta-data for the storage devices 45. Layout of the storage devices 45 comprises, for example, rotation, stripe size, element size, etc. The metadata input 245 optionally comprises any resource optimization objectives for use by the optimizer module 210. The resource optimization objectives comprise optimization criteria such as minimizing disk I/O or minimizing memory bus bandwidth. This input guides the optimizer module 210 in selecting I/O strategies for a given read or write.

The optimizer module 210 has few options for fault-free reads where the only reasonable option is to read the required page directly from the appropriate disk in the storage devices 45. The optimizer module 210 has many options for writes. Each of these options can require a different number of disk reads and/or XOR operations. In such cases, the optimizer module 210 uses the input resource optimization objectives to guide selection of the desired I/O plan.

The dynamic input 255 comprises information regarding the data cache 70 such as, for example, a description of clean pages and dirty pages in the data cache 70 that are in a W-neighborhood of the page(s) to be read or written. This description is available from a directory of the data cache 70, the data cache directory. The clean pages are designated as cv. The dirty pages are designated as dv. The dynamic input 255 further comprises information regarding the storage devices 45 such as, for example, a current fault configuration. The current fault configuration (designated as f) comprises a description of known sector failures and disk failures.

The RAID code input 250 comprises a concise description of the RAID code, available from the meta-data for the storage devices 45.

The read/write requests 260 comprise the type of operation (read or write) and arguments associated with the operation. The arguments comprise a block address of the page(s), a starting virtual block address, and a number of bytes to be read or written.

Scenarios under which the data cache 70 invokes system 10 comprise a read on a miss, a flush of a dirty page, a rebuild of a lost page, a scrub of every stripe, and a migrate of a page.

The generic read module 220 responds to the "read on a miss" scenario. The generic read module 220 translates a virtualized block address of the requested page(s) to a corresponding physical block address within an identified disk. In the fault-free case, one or more disk read(s) are issued. If the identified disk (or particular sectors within the identified disk) has failed, system 10 performs a reconstruction by reading related blocks as directed by the RAID code. If reconstruction fails, a read error is returned.

The generic write module 225 responds to the flush of a dirty page scenario. When the cache replacement policy has selected a victim (dirty) page for writing to an identified disk, the generic write module 225 translates the virtual block address of the victim page to a corresponding physical block address within the identified disk. The generic write module 225 identifies one or more dependent (parity) block(s) as determined by the RAID code. The generic write module 225 determines how to update the dependent (parity) blocks and issues that determination with a write I/O plan.

The generic rebuild module 235 responds to the "rebuild a lost page" scenario. The "rebuild a lost page" scenario is generated by an internal housekeeping routine to repair lost data due to sector or disk failure. The generic rebuild module 235 reconstructs the lost page using the redundant information within the RAID code and then writes the lost page to a new location. The rebuild process of the generic-rebuild module 235 can be viewed as a composition: reconstruct read followed by write.

The generic migrate module 240 responds to the "migrate a page" scenario. Triggered by an administrative action, migration is invoked to change the RAID code of a page. Changes comprise varying the span (rank) of disks. For example, the span may be changed from an 8-disk RAID 5 to a 5-disk RAID 5. Changes further comprise changing the RAID code. For example, the RAID code may be changed from RAID 5 to EVENODD. The migration process of the migration module 240 can be viewed as a composition: read, using the old code, followed by write, using the new code.

The generic RAID engine module 205 transforms the input into the I/O plan 235 that comprises a set of blocks to be read, a set of blocks to be XORed, and a set of blocks to be written. The I/O plan 265 is input to the execution engine 215 that issues the necessary disk reads and writes and monitors or computes XOR operations.

The execution engine 215 executes the I/O plan 265 in the following phases: disk reads are submitted, the XOR operations are performed, and the disk writes are submitted. Serialization mechanisms such as, for example, stripe locking, are localized to the execution engine 215. One aspect of the execution engine 215 comprises error handling, specifically when encountering new failed sectors or disks during execution. The execution engine 215 modifies the fault configuration based on this new information and re-submits the operation to the generic RAID engine module 205. The generic RAID engine module 205 computes a new I/O plan 265 that is handed to the execution engine 215. Thus, system 10 unifies the error path with the main path. Consequently, the recovery code is no different from the main path.

By incorporating the RAID code information, the physical arrangement of the storage system 25, the current fault configuration, and the dynamic state of the data cache 70, system 10 determines an optimum way to perform a given read or write. The fault-free and fault-ridden code paths utilized by system 10 provide a simplification for nested error handling and recovery that plagues many RAID implementations.

Figure 3B:
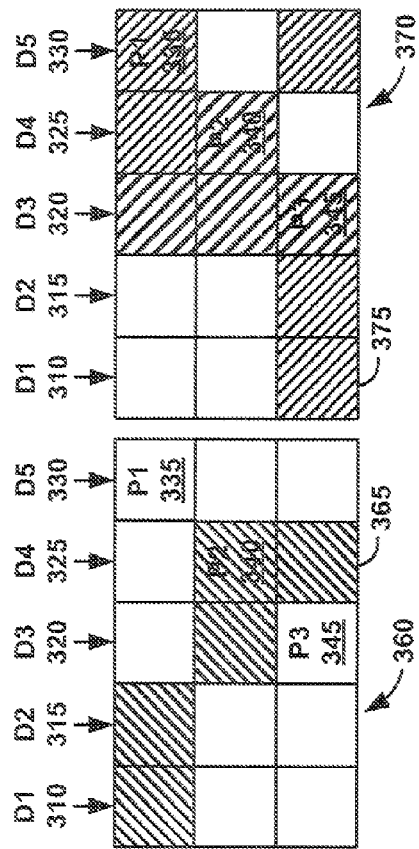
FIG. 3 is comprised of FIGS. 3A, 3B, and 3C and represents a diagram illustrating possible strategies the generic RAID engine system of FIGS. 1 and 2 to perform an exemplary flush operation.
Figure 3C:
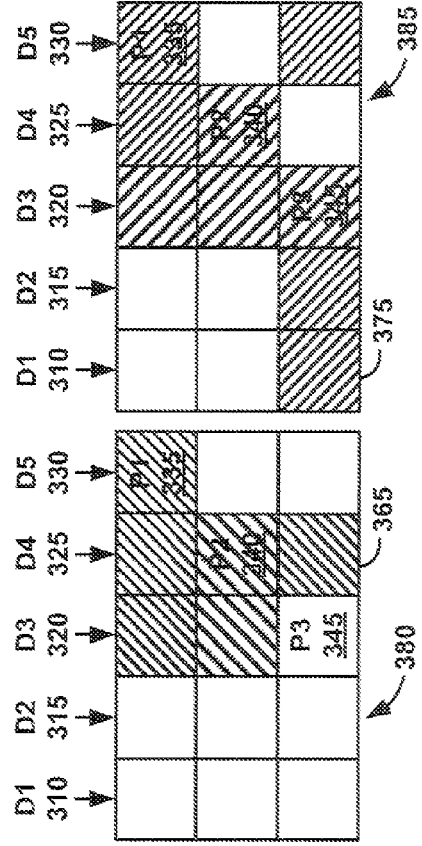
Figure 3A:
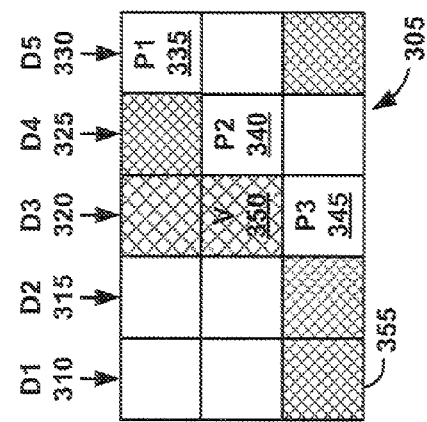

FIG. 3 (FIGS. 3A, 3B, 3C) illustrates the options for the I/O plans 265 generated by system 10 and the cost of the different I/O plans 265 with respect to the number of XORs required and the number of disk reads and writes. The example of FIG. 3 applies to a write request with a left-symmetric RAID 5 code.

FIG. 3A illustrates a stripe 305 for a disk 1 (D1), 310, a disk 2 (D2), 315, a disk 3 (D3), 320, a disk 4 (D4), 325, and a disk 5 (D5) 330. Stripe 305 comprises a parity element 1 (P1), 335, a parity element 2 (P2), 340, and a parity element 3 (P3), 345. The dirty pages within a one-stripe neighborhood of a victim page (V 350) are shaded as indicated by element 355. The shaded pages are flushed in one operation.

FIG. 3B and FIG. 3C illustrate possible strategies for performing the flush operation. FIG. 3B shows stripe 305 as a block of pages 360 with pages to be read indicated with left diagonal shading as illustrated by a page 365. FIG. 3B further shows stripe 305 as a block of pages 370 with pages to be written indicated with a right diagonal shading as illustrated by a page 370. The strategy illustrated by FIG. 3B requires 4 read I/Os, 6 write I/Os, and 14 pages of memory bus usage for XOR. A strategy is a sub-plan that system 10 uses to develop the I/O plan 265.

FIG. 3C shows stripe 305 as a block of pages 380 with pages to read indicated with a left diagonal shading as illustrated by page 375. FIG. 3C further shows stripe 305 as a block of pages 385 with pages to be written indicated by a right diagonal shading as illustrated by page 375. The strategy illustrated by FIG. 3C requires 3 read I/Os, 6 write I/Os, and 15 pages of memory bus usage.

System 10 can select a strategy based on the input resource optimization objectives. For example, system 10 selects the strategy illustrated by FIG. 3B if memory bus usage is to be minimized. Otherwise, system 10 selects the strategy illustrated by FIG. 3C if disk I/O is to be minimized. The strategies shown in FIG. 3B and FIG. 3C are from a possible eight strategies available for the write request illustrated by FIG. 3A.

In XOR-based erasure codes (i.e., RAID codes) any redundant bit is an XOR of a number of data bits. For efficiency, this relationship is applied to fixed-size chunks of bits called elements. An element typically comprises one or more consecutive pages on disk. An element can have either data or parity pages but not a mix of the two. A stripe is the set of data elements and all related parity elements. A parity element in a stripe is a XOR of some subset of data elements within that stripe. The parity element depends on those data elements. The number of elements that a stripe comprises depends both on the number of disks in the storage system 25 (called the rank) and the coding scheme.

For example, FIG. 4 (FIGS. 4A, 4B) illustrates an exemplary stripe 405 of a device utilizing an EVENODD code and a corresponding generator matrix 410 of stripe 405 generated by system 10. The stripe 405 comprises 10 elements for a 2-fault tolerant EVENODD code over 5 devices. The devices comprise a disk 1 (D1), 415, a disk 2 (D2), 420, a disk 3 (D3), 425, a disk 4 (D4), 430, and a disk 5 (D5), 435. Within each stripe 405, e consecutive elements are arranged contiguously on each of the storage devices 25, forming a strip. The elements comprise data elements and parity elements. The data elements comprise an E1, 440, an E2, 445, an E3, 450, an E4, 455, an E5, 460, and an E6, 465. The parity elements comprise a P1, 470, a P2, 475, a Q1, 480, and a Q2, 485.

FIG. 4B illustrates a matrix representation of the stripe 405, the generator matrix 410. A matrix representation of a RAID code is obtained by expressing the XOR relationships between data elements and parity elements as a system of equations. The matrix from such an organization is called its generator matrix, G. The generator matrix is an N×M binary matrix, where N is the number of data elements in a stripe and M is the combined number of data and parity elements in a stripe. A column of G corresponds to an (data or parity) element in the stripe. A column component of G corresponding to a data element typically comprises a single 1. For a parity element, the corresponding column component has additional 1s, one for each data element to which the corresponding parity element relates.

If each element comprises k pages, then G can be rewritten in terms of pages instead of elements by replacing each element entry by an identity matrix of size k. For exemplary purposes only, each element is assumed to correspond to a single page. The terms element and page are used interchangeably.

Layout is the physical (on disk) arrangement of data parity pages within a stripe. Besides configuration parameters such as the size of each page, much of the layout can be discerned from the generator matrix G for the RAID code and e, the number of pages per strip. As illustrated by FIG. 4B and described previously, G can be visualized as blocks of e columns, each block corresponding to physical arrangement of a strip on the disk. When parity pages are interspersed with data pages, the layout is interleaved.

The location of parity pages within a stripe is summarized in a vector of column indices corresponding to parity pages in G. This vector is referred to as the parity arrangement vector, denoted by parity of dimension 1×(M−N).

To allow for even distribution of load across all disks, many layouts are cyclically shifted; i.e., columns of the basic code word are rotated, distributing the parity elements evenly on all disks. This shifting can be represented by a signed number s that defines the cyclical shift of strips per stripe. The sign encodes the shift direction: negative for left symmetric and positive for right symmetric.

The failure state of a page can be derived from a failure state of the disks and a bad sector table. The bad sector table is a persistent data structure that is updated whenever a read error is encountered by a read operation.

System 10 encodes the failure state of a set of n pages as the fault configuration vector f of dimension 1×n, where an entry for page i is marked 1 if that page has failed, otherwise 0.

System 10 modifies the fault configuration vector f as new errors are discovered in the process of executing the I/O plan 265.

Figure 5:
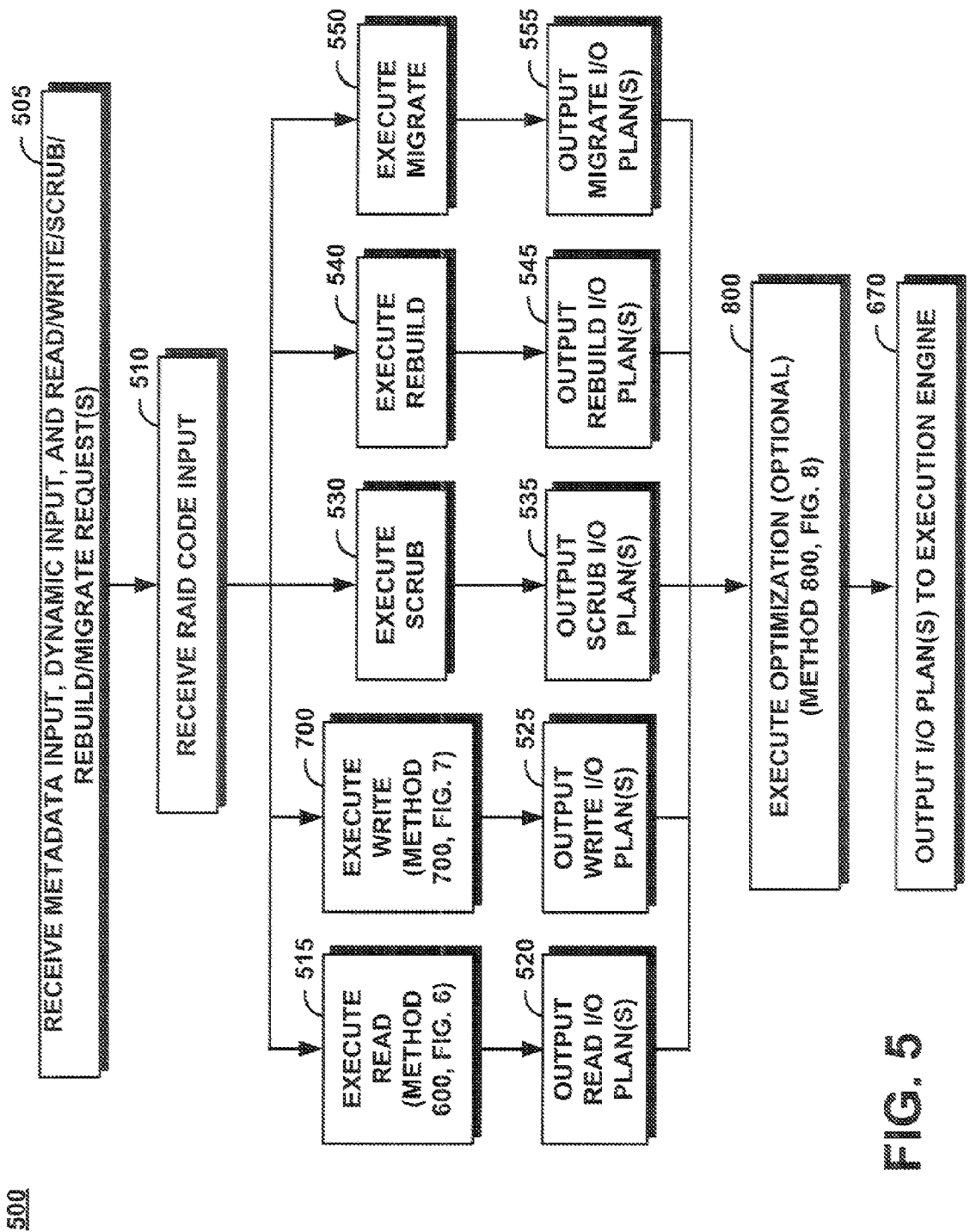
FIG. 5 is a process flow chart illustrating a method of operation of the generic RAID engine system of FIGS. 1 and 2.

FIG. 5 illustrates a method 500 of system 10 in generating I/O plans for execution by the execution engine 215. The generic RAID engine 205 receives the metadata input 245, the dynamic input 255, and the read/write requests 260 (step 505). The generic raid engine 205 receives the RAID code input 250 (step 510).

The generic read module 220 executes a read (method 600, further illustrated in FIG. 6) (step 600). The generic read module 220 outputs one or more read I/O plans (step 515). The generic write module 225 executes a write (method 700, further illustrated in FIG. 7) (step 700). The generic write module 225 outputs one or more write I/O plans (step 525).

The generic scrub module 230 executes a scrub (step 530) and outputs one or more scrub. I/O plans (step 535). The generic rebuild module 235 executes a rebuild (step 540) and outputs one or more rebuild I/O plans (step 545). The generic migrate module 249 executes a migrate (step 550) and outputs one or more migrate I/O plans (step 550). The optimizer module 210 optionally executes an optimization (method 800, further illustrated in FIG. 8) to select an optimum I/O plan 265 (step 800). System 10 provides the output I/O plan(s) 265 to the execution engine 215 (step 560).

In the data cache 70, a victim (dirty) page is determined by the replacement policy for the victim page. While flushing the victim, it is efficient to collectively flush dirty pages that belong to the same stripe as the victim. System 10 defines a W-neighborhood for a victim page, as illustrated by the shaded blocks in FIG. 3A. The W-neighborhood is defined as the set of all pages, clean or dirty, in the data cache 70 that are in a 2W+1 stripe window centered around the stripe of the victim. By choosing W>0, system 10 can batch the flush requests of one or more pages that are presumably physically close, thereby improving the throughput of the disks.

The set of pages in the W-neighborhood of a victim page can be partitioned into clean and dirty page sets. Each set can be encoded as a binary vector, with a 1 in an entry denoting whether the page is in cache. The clean data vector is denoted cv and the dirty data vector is denoted dv.

The I/O plan 265 is a 3-tuple (r, X, w). The vector r is a vector encoding of the set of disk read operations required by the I/O plan 265. A non-zero entry denotes that the corresponding page is to be read. Similarly, w is a vector encoding of the set of disk write operations required by the 610 plan 265. The vector X is the set of XOR operations, each of which is a list of pages to be XORed yielding a resultant data or parity page. The vector X % can be encoded as a square matrix of dimension M×M where a column component i describes the set of pages to be XORed to compute page i of the stripe.

If the requested pages can be read from good disk(s), then it is trivial to set r to the corresponding pages on the disk(s). In this scenario, both X and w are zero.

The challenging case for the generic read module 220 is when reconstruction is required due to sector or disk failures. From the generator matrix G, a modified matrix $\hat{G}$ is derived as follows. For every failed sector, the entries corresponding to that row in G are zeroed. For every failed disk, the columns corresponding to pages on disk are zeroed. Formally, G is computed as follows:

$$\hat{G} = G(I_M - \text{diag}(f))$$

where $I_M$ is the identity matrix of size M, and diag(f) is the matrix derived by applying the fault configuration vector f as the diagonal of the M×M matrix.

Next, using a variant of Gaussian elimination, a pseudo-inverse $R(G^{-1})$ is computed. R is of dimension M×N where the column component i corresponds to a description of the set of surviving pages (data or parity) that are required to be read and XORed to reconstruct data page i.

If the RAID code allows, the pseudo-inverse technique finds a reconstruction scheme using only the surviving pages. From linear algebra, since G describes an over-specified system of equations, its inverse R is not unique (hence the name pseudo-inverse). Each pseudo-inverse, R, of $\hat{G}$ defines a read strategy. Given resource optimization objectives, the optimizer module 210 picks a suitable strategy and the relevant pseudo-inverse R. The columns of R that correspond to the lost and required pages are extracted to r and X. Since some of the required pages may already be in cache, r is logically ANDed with the clean cache vector cv to yield the set of pages that the execution engine 215 is required to read from disk. In the case of reconstruct reads, w is zero.

Figure 6A:
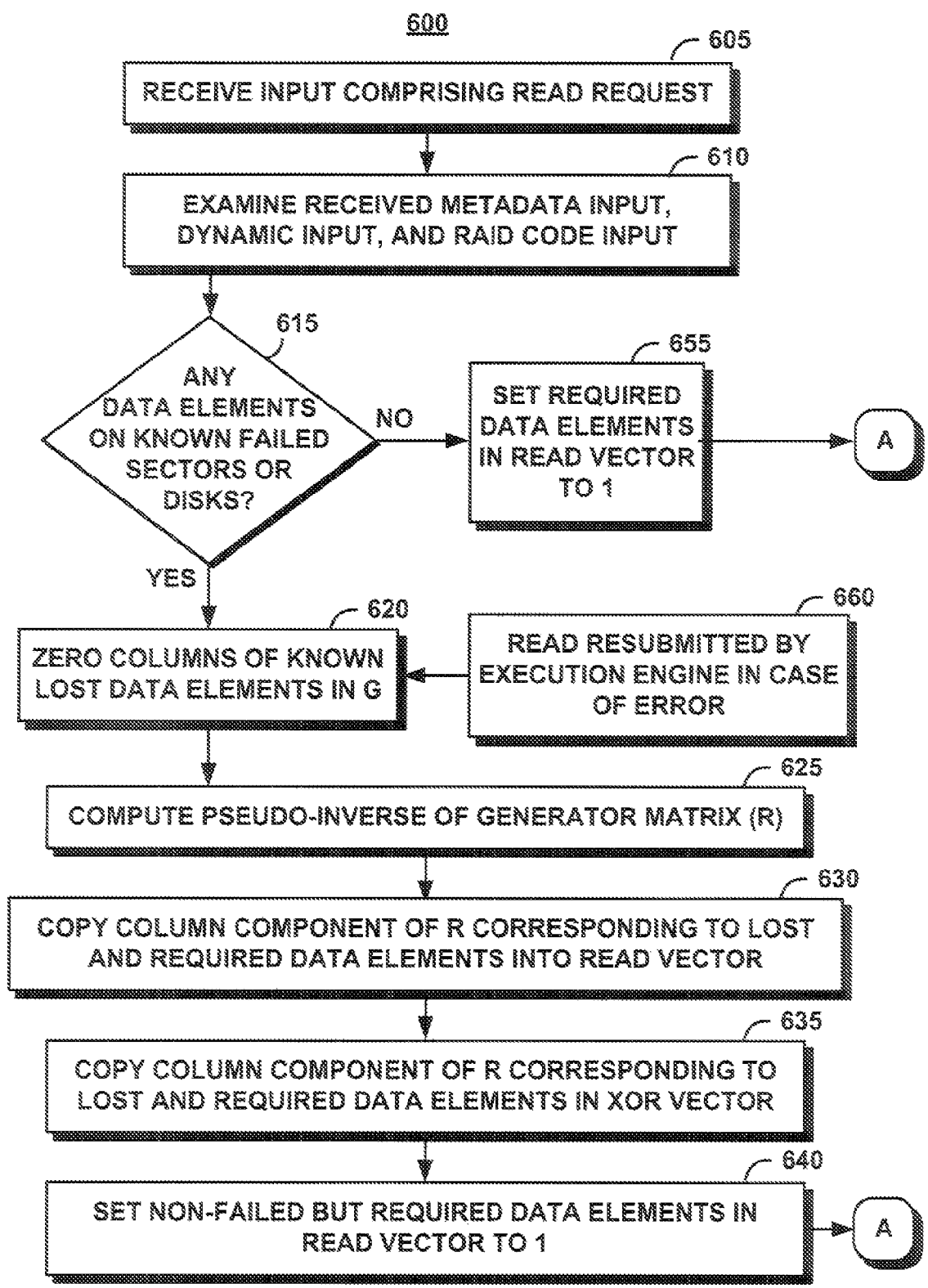
FIG. 6 is a process flow chart illustrating a method of operation of a generic read module of the generic RAID engine system of FIGS. 1 and 2.
Figure 6B:
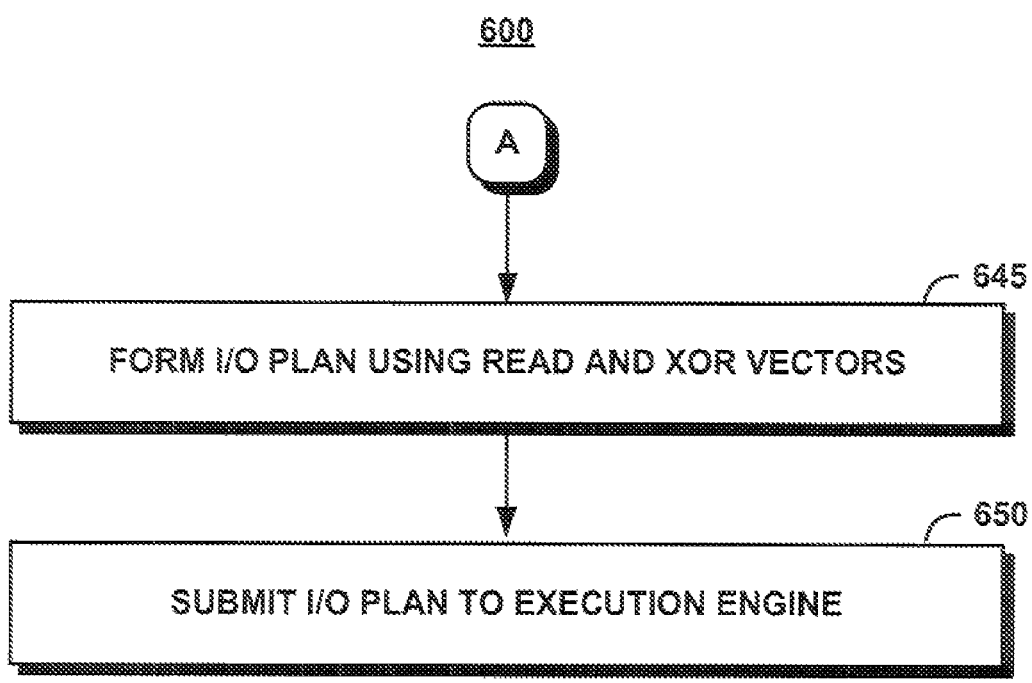

FIG. 6 illustrates a method 600 of the generic read module 220 in executing the read. System 10 receives input comprising a read request (step 605). The generic read module 220 examines received metadata input, dynamic input, and RAID code input (step 610). The generic read module 220 determines if any data elements required by the read reside on known failed disks or sectors (decision step 615). If yes, the generic read module 220 sets to zero the columns of the known lost data elements in G (step 620).

The generic read module 220 computes a pseudo-inverse of the generator matrix R (step 625). The generic read module 220 copies a column component of R corresponding to lost and required data elements into the read vector (step 630). The generic read module 220 copies a column component corresponding to lost and required data elements in XOR vector (step 635). The generic read module 220 sets non-failed but required data elements in read vector to 1 (step 640). The generic read module 220 forms an I/O plan using read and XOR vectors (step 645). System 10 submits the I/O plan to the execution engine 215 (step 650).

If, at decision step 615, no data elements required by the read reside on known failed sectors or disks, the generic read module 220 sets required data elements in read vector to 1 (step 655). Processing proceeds to step 645 and step 650, previously described.

In case of error, a read may be resubmitted by the execution engine 215 (step 660), with processing proceeding from step 620 to step 650, as previously described.

Figure 7A:
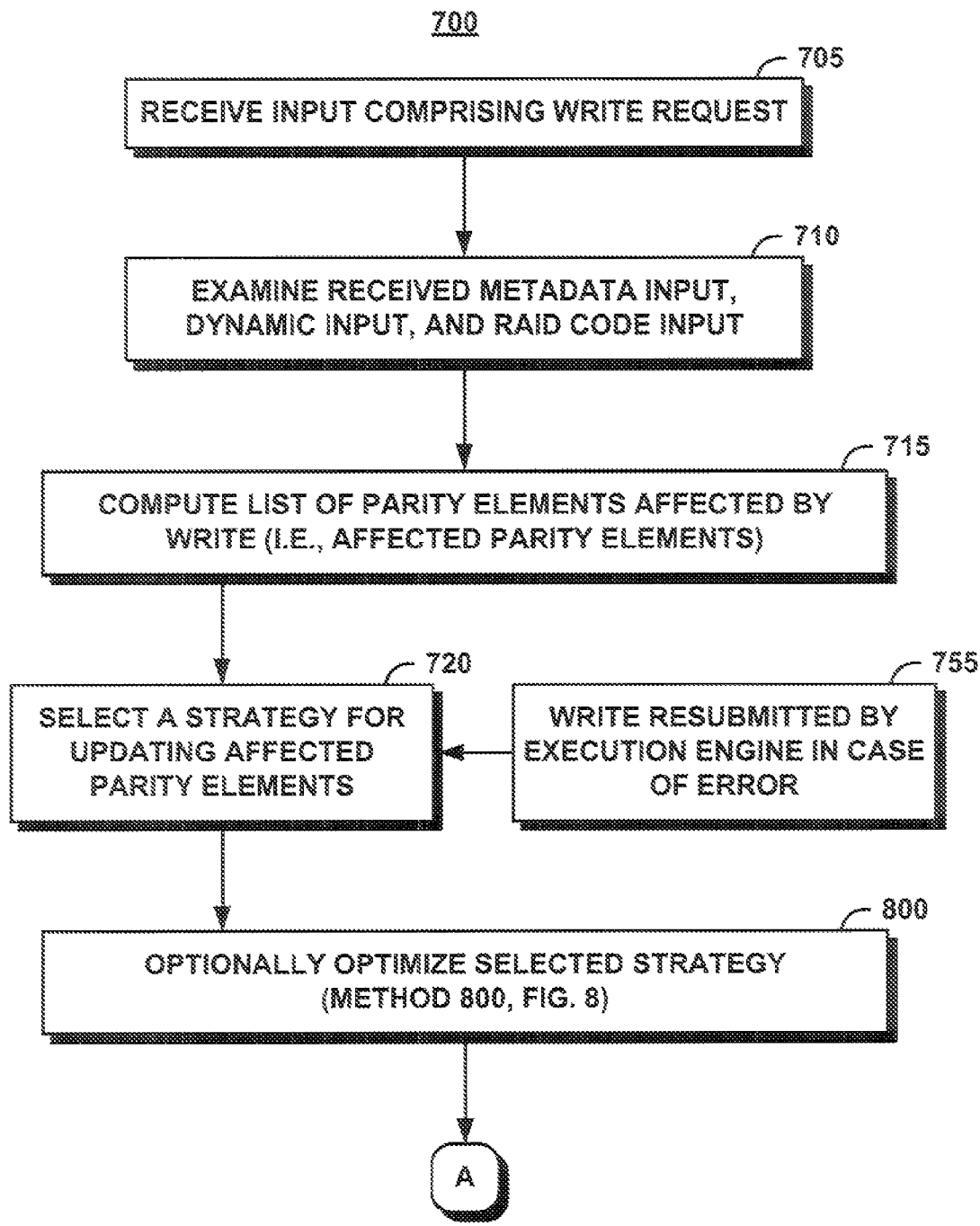
FIG. 7 is a process flow chart illustrating a method of operation of a generic Write module of the generic RAID engine system of FIGS. 1 and 2.
Figure 7B:
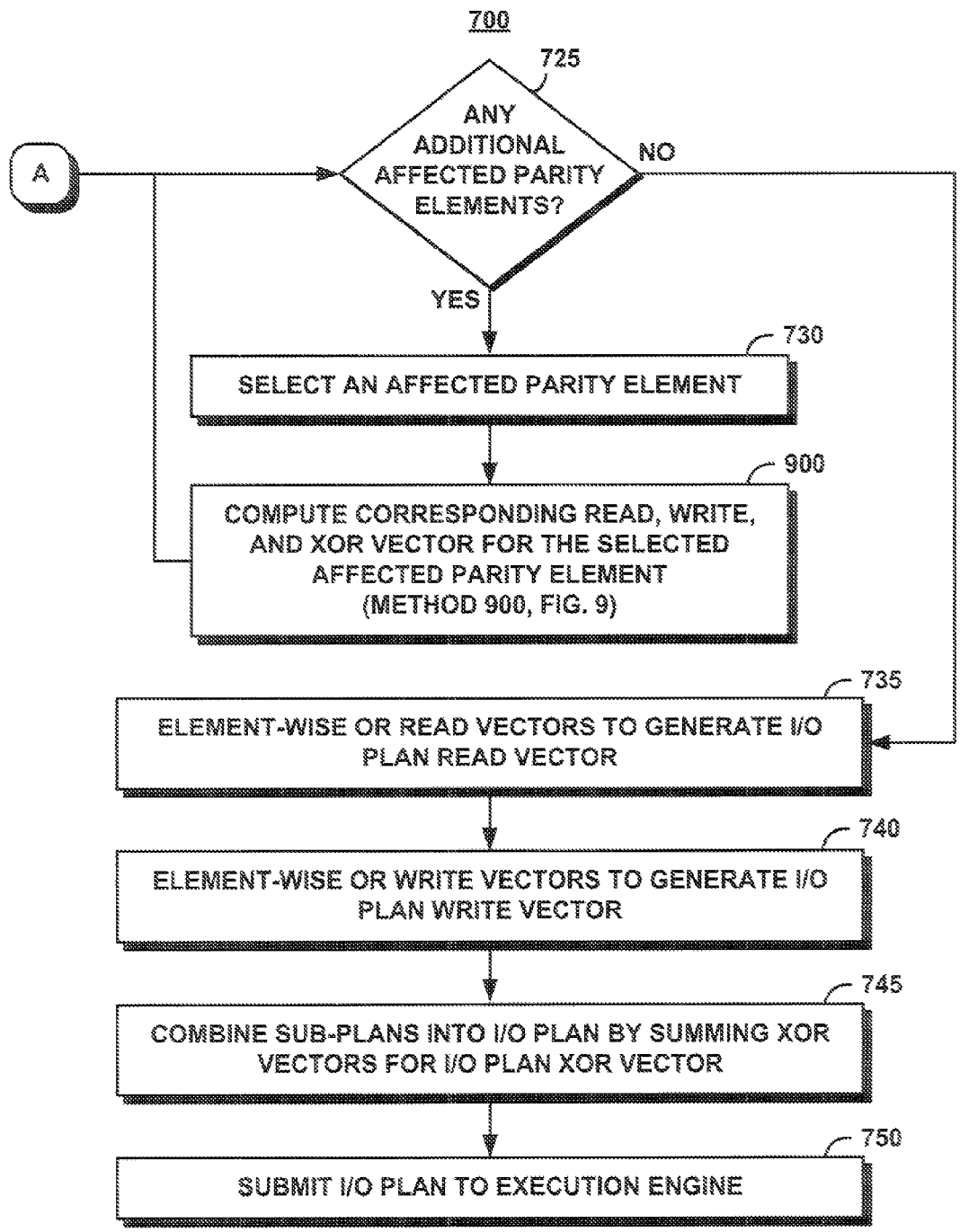

FIG. 7 illustrates a method of the generic write module 225 executing a write. System 10 receives input comprising a write request (step 705). The generic write module 225 examines received metadata input, dynamic input, and RAID code input (step 710). The generic write module 225 computes a list of parity elements affected by the write (further referred to herein as affected parity elements) (step 715). The generic write module 225 selects a strategy for updating affected parity elements (step 720). The optimizer module 210 optionally optimizes the selected strategy (step 800, further described by method 800, FIG. 8).

The generic write module 225 determines if any additional affected parity elements exist (decision step 725). If yes, the generic write module 225 selects an affected parity element (step 730). The generic write module 225 computes a sub-plan from the corresponding read, Write, and XOR vectors for the selected affected parity element (step 900, further described by method 900 of FIG. 9). The generic write module 225 repeats steps 725, 730, and 900 until no additional affected parity elements remain for processing.

If, at decision step 725, no additional affected parity elements remain for processing or if no affected parity elements corresponded to the write request, the generic write module 225 element-wise ORs read vectors to generate an I/O plan read vector (step 735). The generic write module 225 element-wise ORs write vectors to generate an I/O plan Write vector (step 740). The generic write module combines sub-plans into an I/O plan by summing XOR vectors for the I/O plan XOR-vector (step 745). System 10 submits the I/O plan to the execution engine (step 750). The execution engine 215 resubmits a write in case of error (step 755) and processing proceeds at step 720.

The generic write module 225 constructs affected parity vectors (step 715). Recollect that the victim page to be written out is expanded to include the W-neighborhood of dirty pages. The dirty data vector dv is then the set of pages to be written out; dv includes the victim. In any RAID code, the changed content of data pages is reflected to corresponding dependent parity pages. Consequently, the generic write module 225 identifies all dependent parity pages. This can be determined by logically ANDing the dirty data vector with each column component of a parity page in $\hat{G}$. Every resultant non-zero vector implies that that surviving parity page requires updating as part of writing dv. Parity pages with a resulting zero column imply that either the parity page is unaffected or that the parity page cannot be written to due a sector or disk failure.

The generic write module 225 encodes the list of affected parity pages as a binary vector where an entry for a parity page is set to 1 if that page is affected, 0 otherwise. This binary vector is referenced as the affected parity vector.

The generic write module 225 determines whether the layout is degraded (decision step 904). If no, the generic write module 225 computes inverse matrix (step 924). When computing the inverse matrix in step 924, the write module determines how each affected parity page is updated. With erasure-coded data, any parity element can be updated using parity increment or parity compute. Parity increment is referred to as read-modify-write in RAID 5 firmware. In parity increment, on-disk versions of the modified data and parity pages are initially read and a parity difference (referred to as delta parity) between the new and old version of the data page is computed. The delta parity is applied to the old version of the parity to derive the new parity. Parity compute is referred to as full-stripe-write in RAID 5 firmware. In parity compute, all unmodified data pages on which a parity page depends are read from disk. The unmodified data pages are XORed with the dirty pages to compute the updated parity page.

For a fault-free write, as indicated by a no response to decision any correct update of dirty pages in any erasure coded stripe is some combination of parity increment or parity compute for each of the affected parity pages. Updates that reuse results from one parity update (delta parity) for another can be re-written as if each parity page were updated separately. Each instantiation of a parity increment or parity compute for non-zero entries in the affected parity vector is a write strategy.

For any write, if p parity pages are affected there are $2^P$ write strategies for selection by system 10. Since each write strategy translates to a different I/O plan, system 10 can select a write strategy that meets the resource optimization objectives.

If, at decision step 615, the layout is degraded, the generic write module 225 prepares failure vectors. In the presence of sector or disk failures, the generic write module 225 reconstructs the pages needed for parity increment or parity compute before updating the parity page itself. In case of parity increment, the on-disk version of the modified data is reconstructed, if lost. For parity compute, the on-disk version of the unmodified data is reconstructed, if lost. The inverse matrix is then computed as before (step 924).

Given a write strategy, for each affected parity page, the generic write module 225 can compute the pages to be read, XOR-ed and written independently. The generic write module 225 calculates each sub-plan, the I/O plan corresponding to each affected parity page, using column components from the pseudo-inverse to translate the write strategy (parity increment or parity compute) into reads, XORs, and writes. In computing the read set, the clean page vector cv is used to cull out pages that can be readily served from 745 the read cache.

The generic write module 225 generates one or more sub-plans by combining individual r, w, X vectors (step). If the sub-plan for affected parity page k is denoted by $(r_k, X_k, w_k)$, the generic write module 225 derives the combined I/O plan by summing the individual sub-plans.

$$r = \sum_{k \in parity} r_k$$

$$X = \sum_{k \in parity} X_k$$

$$w = \sum_{k \in parity} w_k$$

The generic write module 225 adjusts for physical layout (step 735). The generic write module 225 generates the write I/O plan(s) comprising the R, W, X matrices (step 750).

An example for write, assuming a fault-free configuration of the EVENODD code with a rank of 5 disks, is described as follows. A sketch of the physical arrangement is illustrated by stripe 405 in FIG. 4A; the generator matrix 410 for this code is shown in FIG. 4B. This code has two pages per strip (e=2), 6 data pages (N=6) and a total of 10 pages per stripe (M=10). The physical arrangement of parity pages is parity=(7, 8, 9, 10)$^t$.

In this example, there are no clean pages available for this stripe. Being fault-free, f=0. Hence, $$\hat{G} = G(I_M - \text{diag}(f)) = G$$

For the purposes of this example, pages D1 and D3 are dirty. Then, $$dv = \begin{pmatrix} 1 \\ 0 \\ 1 \\ 0 \\ 0 \\ 0 \\ 0 \end{pmatrix}$$

The generic write module 225 computes the set of affected parity pages by ANDing the dirty page vector with G for each parity page 715. Below is a tabulation of this calculation for each parity page in the stripe.

| P1 | P2 | Q1 | Q2 |
|---|---|---|---|
| 1 | 0 | 1 | 0 |
| 0 | 0 | 0 | 0 |
| 1 | 0 | 0 | 1 |
| 0 | 0 | 0 | 0 |
| 0 | 0 | 0 | 0 |
| 0 | 0 | 0 | 0 |

In this example, P2 is unaffected as is seen by a corresponding zero column. The generic write module 225 generates a write I/O plan 720. For example, the generic write module 225 selects, as a strategy for the write I/O plan, $\text{strategy}_A$:

$$\text{strategy}_A = \begin{pmatrix} P1 \\ P2 \\ Q1 \\ Q2 \end{pmatrix} = \begin{pmatrix} \text{parity compute} \\ - \\ \text{parity compute} \\ \text{parity increment} \end{pmatrix}$$

The generic write module 225 generates sub-plans for each affected parity page. The sub-plan for P1 is:

$$r_{P1} = \begin{pmatrix} 0 \\ 0 \\ 0 \\ 0 \\ 1 \\ 0 \\ 0 \\ 0 \\ 0 \end{pmatrix}; X_{P1} = \begin{pmatrix} 1 \\ 0 \\ 1 \\ 0 \\ 1 \\ 0 \\ 0 \\ 0 \\ 0 \end{pmatrix}; w_{P1} = \begin{pmatrix} 1 \\ 0 \\ 1 \\ 0 \\ 0 \\ 0 \\ 1 \\ 0 \\ 0 \\ 0 \end{pmatrix}$$

The sub-plan for Q1 is:

$$r_{Q1} = \begin{pmatrix} 0 \\ 0 \\ 0 \\ 1 \\ 1 \\ 1 \\ 0 \\ 0 \\ 0 \end{pmatrix}; X_{Q1} = \begin{pmatrix} 1 \\ 0 \\ 0 \\ 1 \\ 1 \\ 1 \\ 0 \\ 0 \\ 0 \end{pmatrix}; w_{Q1} = \begin{pmatrix} 1 \\ 0 \\ 0 \\ 0 \\ 0 \\ 0 \\ 0 \\ 1 \\ 0 \end{pmatrix}$$

The sub-plan for Q2 is:

$$r_{Q2} = \begin{pmatrix} 0 \\ 0 \\ 0 \\ 1 \\ 0 \\ 0 \\ 0 \\ 0 \\ 1 \end{pmatrix}; X_{Q2} = \begin{pmatrix} 0 \\ 0 \\ 2 \\ 0 \\ 0 \\ 0 \\ 0 \\ 0 \\ 1 \end{pmatrix}; w_{Q2} = \begin{pmatrix} 0 \\ 0 \\ 1 \\ 0 \\ 0 \\ 0 \\ 0 \\ 0 \\ 1 \end{pmatrix}$$

The generic write module 225 combines the sub-plans to generate the write I/O plan (step 745):

$$r = \begin{pmatrix} 0 \\ 0 \\ 1 \\ 1 \\ 2 \\ 1 \\ 0 \\ 0 \\ 0 \\ 1 \end{pmatrix}; X = \begin{pmatrix} 7 & 9 & 10 \\ 1 & 1 & 0 \\ 0 & 0 & 0 \\ 1 & 0 & 2 \\ 0 & 1 & 0 \\ 1 & 1 & 0 \\ 0 & 1 & 0 \\ 0 & 0 & 0 \\ 0 & 0 & 0 \\ 0 & 0 & 0 \\ 0 & 0 & 1 \end{pmatrix}; w = \begin{pmatrix} 2 \\ 0 \\ 2 \\ 0 \\ 0 \\ 0 \\ 1 \\ 0 \\ 1 \\ 1 \end{pmatrix}$$

For brevity, only the non-zero columns of X are shown. The number atop the horizontal line in X denotes the column index.

The generic rebuild module 235 performs rebuild (step 535, FIG. 5). Rebuild is the operation of reconstructing failed pages within a stripe and writing the reconstructed pages to new disk locations. The rate at which rebuild is performed primarily determines the data availability. The generic rebuild module 235 makes rebuild generic to the RAID code.

The generic rebuild module 235 performs rebuild when there is a sector failure or a disk failure. In the former case, rebuild is typically performed for the affected stripe. This affected stripe can be scattered over a storage volume. In the case of a disk failure, the generic rebuild module 235 batches rebuilds. Within each batch, one or more stripes are rebuilt simultaneously since rebuilding stripes translates to sequential disk reads and writes.

To perform a rebuild for a set of lost pages within a stripe, the generic rebuild module 235 executes a read for the set of lost pages. The generic rebuild module 235 selects an optimal I/O read plan for reconstructing the failed pages. The execution engine 215 executes the resultant I/O plan 265. The generic rebuild module 235 submits to the execution engine 215 a rebuild I/O plan with the vector W set to the reconstructed pages. The vectors r and X of the submitted rebuild I/O plan are zero.

In one embodiment, the generic rebuild module 235 directs the execution engine 215 to read and write out the entire stripe instead of just the minimum pages required for reconstruction. This is done to detect any lurking sector failures.

In some layouts, spare space for rebuild is interleaved within the stripe. Such information is captured in the layout input of the metadata input 245.

Most RAID implementations also support RAID migration, a process performed by the generic migrate module 240. The migration process re-lays data that was stored in one layout in another layout. Migration comprises changing stripe size or stripe rank; i.e., re-layout a 5-disk RAID 5 code to a 7-disk RAID 5 code. Migration further comprises changing the RAID code itself; i.e., re-layout a 5-disk 1-fault tolerant RAID 5 code into a 5-disk 2-fault tolerant EVENODD code, or a combination of the two.

In RAID migration, a volume Written in a source layout is re-written in a target layout. Typically, for space efficiency, this migration is performed in place; i.e., the same set of sectors and disks in the source layout are reused for the target layout. Migration proceeds in some multiples of stripes. Typically, this multiple is either determined by the least common multiple of stripe sizes of the source and target layouts, or by the stripe size target layout alone. A staging area on disk may be used to store temporary results if cache memory is limited.

The generic migrate module 240 directs the reading of all data pages from the source layout using read. System 10 performs any reconstructions, if needed, during this process. The generic migrate module 240 inputs to write the list of data pages for the target layout as if all the parity pages were lost.

In one embodiment, the generic migrate module 240 reads all pages (data and parity) in the source layout. If possible, the generic migrate module 240 reuses parity pages from this layout as partial results for computing parity pages of the target page. Reusing parity pages from the source layout can reduce the memory bandwidth needed for the migration.

System 10 performs initialization. Initialization is layout independent in that all regions of a volume are zeroed. Initialization is typically performed in batches by writing sufficiently large writes with zeroes.

The generic scrub module 230 performs scrubbing as a periodic scan of every stripe to check for latent hard errors. The generic scrub module 230 implements scrubbing by using a "parity check matrix" H for a RAID code that is computed from its generator matrix G. H is a M×(M−N) matrix where each column component corresponds to a parity page in the RAID code. If all pages with entry 1 in that column are XORed, the result is a zero page. A resultant non-zero page implies an inconsistent parity. Overwriting the erroneous parity page with the correct value rectifies this inconsistent parity.

H is derived from G by rearranging column blocks of G into row blocks in H and including an identity matrix (corresponding to the parity pages). An exemplary parity check matrix for the 5-disk-2-fault tolerant EVENODD code is as follows:

$$H = \begin{pmatrix} P1 & P2 & Q1 & Q2 \\ 1 & 0 & 1 & 0 \\ 0 & 1 & 0 & 1 \\ 1 & 0 & 0 & 1 \\ 0 & 1 & 1 & 1 \\ 1 & 0 & 1 & 0 \\ 0 & 1 & 1 & 0 \\ 1 & 0 & 0 & 0 \\ 0 & 1 & 0 & 0 \\ 0 & 0 & 1 & 0 \\ 0 & 0 & 0 & 1 \end{pmatrix}$$

The optimizer module 210 selects one strategy over another as guided by specified resource optimization objectives. To translate the resource optimization objectives into optimization metrics that can be used by the optimizer module 210 to improve strategy selection, the optimizer module 210 uses optimization metrics comprising the number of distinct disk read and write commands needed to execute an I/O plan and the number of cache pages input to and output from XOR operations in executing an I/O plan.

The number of distinct disk read and write commands needed to execute an I/O plan measures disk overhead; i.e., distinct seeks and/or rotations. In a simple cost model, this metric assumes that disk seeks are equal cost. Minimizing distinct disk read and write commands leads to lower disk overhead in service requests, effectively improving the throughput of the disk.

The number of cache pages input to and output from XOR operations in executing an I/O plan measures the memory overhead incurred. Minimizing XOR leads to lower memory bandwidth usage.

In one embodiment, the optimization module 210 utilizes second order optimization metrics such as, for example, variance in the number of distinct read and write commands among all disks. Additional optimization metrics can be defined that allow for variable seeks. Further optimization metrics can relate to CPU costs. Furthermore, optimization metrics can comprise customizations based on architecture.

Figure 8:
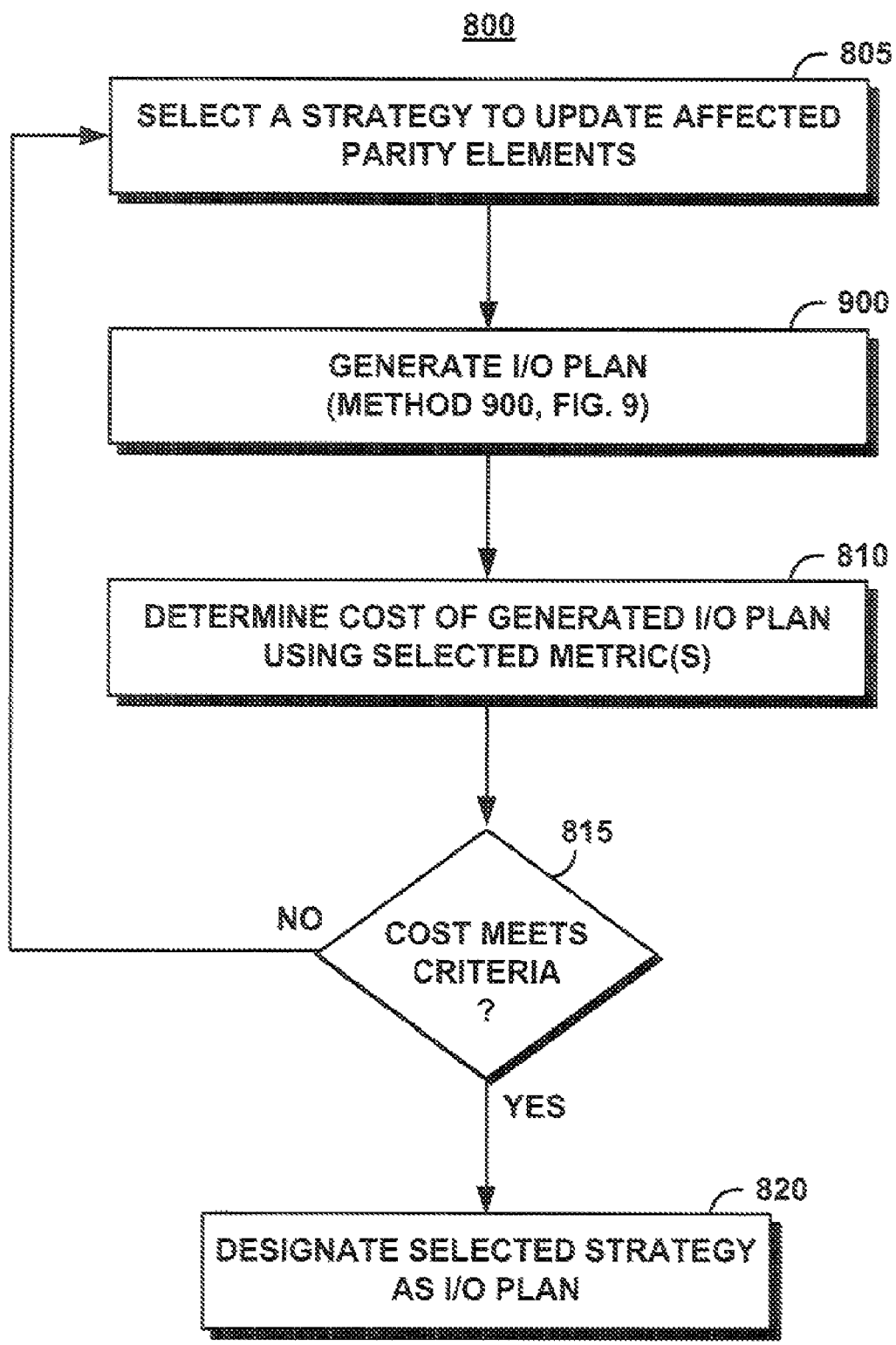
FIG. 8 is a process flow chart illustrating a method of operation of an optional optimizer module of the generic RAID engine system of FIGS. 1 and 2.

FIG. 8 illustrates a method 800 of the optimizer module 210, given optimization metrics for an I/O plan, selecting among competing strategies by costing I/O plans. The optimizer module 210 selects a strategy to update affected parity elements (step 805). The optimizer module 210 generates an I/O sub-plan (step 900, further described by method 900 of FIG. 9).

The optimizer module 210 determines a cost of the selected strategy (step 810). The optimizer module 210 determines whether a determined cost meets predetermined criteria (decision step 815). If no, the optimizer module 210 returns to step 806 to select another strategy. If yes, the optimizer module 210 designates the selected strategy as the I/O plan (step 820).

To compute the number of distinct read and write commands needed to execute an I/O plan, the optimizer 210 restructures both r and w into matrices of the shape of G. The optimization module 210 turns runs of e entries into columns. The optimization module 210 exchanges columns based on the parity arrangement vector parity. The optimization module 210 rotates the columns by the cyclical shift s. In the resulting matrices (one for reads and one for writes) the optimization module 210 counts the number of vertical runs of non-zero entries to compute the number of distinct read and write commands needed to execute the I/O plan. A run of non-zero entries in either matrix represents sequential I/Os.

To compute XOR for an I/O plan, the optimization module 210 sums the entries in X.

Given a set of metrics and a definition of the space of all possible strategies, the optimization module 210 can use any search technique to find an I/O plan that suits the resource optimization objectives.

For reconstruct reads, each pseudo-inverse matrix, R, leads to a strategy. Each strategy can be measured by the number of distinct read and write commands needed to execute the I/O plan or XOR.

For writes, an exhaustive enumeration of all strategies can be CPU intensive especially for higher fault tolerant codes and larger W-neighborhoods. Consequently, heuristics are used to reduce CPU load. Exemplary heuristics used by the optimization module 210 comprise BASELINE and GRADIENT. BASELINE is a heuristic taken from existing (where possible) RAID implementations. GRADIENT is a greedy heuristic.

The optimization module 210 employs a simple majority rule to determine whether to perform parity increment or parity compute. If a majority of pages for a stripe are clean or dirty then the optimization module 210 selects parity compute. Otherwise, the optimization module selects parity increment. Under degraded mode, the optimization module 210 uses parity increment. The complexity of the BASELINE heuristic is O(p), where p is the number of affected parity elements. BASELINE uses a window size of 1; i.e., a 0-neighborhood where only pages in the victim stripe are considered.

The GRADIENT heuristic selects a write strategy by incrementally assigning parity increment or parity compute to each non-zero entry in the affected parity vector. As each affected parity is assigned, the GRADIENT heuristic favors the assignment that results in a lower cost (based on the number of distinct read and write commands needed or XOR).

GRADIENT improves on BASELINE since the optimization module 210 selects a strategy for the next affected parity page based on the assignments to previously assigned parity pages. The complexity of the GRADIENT heuristic is $O(\eta)$, where $\eta$ is the number of affected parity elements.

The execution engine 215 executes an I/O plan from a read or write. Reads are submitted and completed. XORs are calculated. Writes are submitted. Prior to submission and completion of reads, the execution engine 215 transforms r and w in the I/O plan 265 to a matrix in the shape of G, in a manner similar to that previously described. The resultant read and write matrices are used by the execution engine 215 to coalesce runs of non-zero entries into single sequential I/O commands.

The execution engine 215 is responsible for the following:
Ensuring that phases of the I/O plan 265 are executed as part of a single transaction; i.e., there are no interleaving of two concurrently executing 10 plans that overlap on pages on disk. Either all or none of the reads, XORs, and writes of the I/O plan 265 are performed.
Retrying operations in case of timeouts from disks or during XOR operations.
Updating the fault configuration vector f if any new sector or disk failures are discovered while executing a plan. In such an event, the I/O plan 265 is aborted and the I/O resubmitted to the RAID engine (with the updated fault configuration vector f).

Ensuring that the phases of the I/O plan 265 are executed as part of a single transaction ensures that if one or more I/O plans 265 have overlapping pages, the execution engine 215 ensures (some) consistent ordering. Any robust solution to this problem employs use of an on-disk log or reliance on persistent memory (NVRAM). The latter approach is common among commercial RAID controllers since most commercial RAID controllers perform write-back caching that requires persistent memory. In these implementations, a stripe lock table, kept in persistent memory, maintains the lock state of stripes being touched by concurrent I/O plans. The execution engine 215 acquires all locks for stripes in the W-neighborhood before beginning execution.

The execution engine 215 requires resources necessary to complete the I/O plan 265 either in advance of the execution or in a pre-ordered sequence. This is necessary to avoid deadlocks. The execution engine 215 is responsible for simple retries such as, for example, resubmitting timed out disk reads and writes and/or any errors during XORs.

System 10 unifies the error path with the main path through parameterization of the fault configuration vector f. If the execution engine 215 discovers any new failures (sector or disk) during execution of the I/O plan 265, the execution engine 215 updates the fault configuration vector f, aborts the I/O plan 265, and resubmits the I/O plan 265 the generic RAID engine module 205. The generic RAID engine module 205 computes a new I/O plan 265 based on the updated fault state.

Traditional RAID controllers comprise hardware support for XOR. An XOR engine, typically built into the memory controller, allows the embedded processor to offload XOR calculations. The processor submits a scatter-gather list of memory addresses that form the inputs to the operation and an address to store the result to the XOR engine. Once this task is submitted, the processor is free to work on other I/Os until the XOR engine signals completion. The XOR engine uses direct memory access (DMA) to fetch the operands and store the result.

The approach to computing XOR the cost metric used by system 10 reflects the presence of an XOR engine. XOR engines are expensive since they require support in the memory controller. A recent trend to reduce this cost utilizes a commodity processor to perform the XOR as well as I/O handling. This change allows system 10 to take advantage of the L2 caches in these processors by combining one or more memory fetches for a set of XOR operations with overlapping inputs into a single fetch (for each) of the operands. Chunks of operand pages are fetched into the L2 cache and the resultant pages are stored into the L2 cache.

In one embodiment system 10 is adapted to this XOR architecture. While computing the total-XOR cost for an I/O plan, system 10 counts the number of non-zero entries in X in lieu of summing up all entries in X. This change in costing reflects memory bandwidth used when the processor calculates XOR.

Hierarchical RAID schemes are structured in layers where one RAID code is used at the top level and another at the lower level. Such layering can boost fault-tolerance at the cost of reduced storage efficiency. Currently, commercial RAID controllers support RAID 51, a hierarchical scheme that layers a RAID 5 layout over a RAID 1 layout.

Of greater relevance to future RAID systems are intra-disk redundancy schemes. The goal of such schemes (called SPIDRE) is to build intra-disk redundancy aimed at reducing hard error rates in presence of correlated failures.

In one embodiment, system 10 is adapted to handle this hierarchy in a RAID scheme. System 10 computes the composite generator matrix of such a scheme by multiplying generator matrices. An exemplary combined generator matrix G' for a system using EVENODD over disks that internally use SPIDRE is:

$$G'=G_{EVENODD} \times G_{SPIDRE}$$

Working off G', system 10 can generate I/O plans for the hierarchical RAID scheme. Any hierarchical RAID scheme increases the number of affected parity pages for a given read or write, underlying the need for an efficient heuristic for strategy selection.

An emerging trend in storage architectures is the rise of clustered storage systems, etc. In these systems, data is striped across nodes, each of which has a network connection, a processor (and memory), and a group of disks. Layouts span across nodes instead of disks as in traditional RAID systems. Such architectures can allow for scaling of capacity, reliability and performance at a low cost.

In one embodiment, system 10 is adapted for such distributed architectures. This adaptation is limited to changes to the execution engine 215. Access and updates to data striped using distributed RAID comprise some serialization and recovery protocol to handle (a) access to data from one or more clients, (b) transient errors from the network and/or nodes, and (c) untrusted nodes. Any suitable protocol can be implemented within the execution engine 215 of system 10. The unification of the main path with the error path in system 10 allows for simplifying implementation of schemes that rely on retries for detecting out of order execution between one or more clients.

System 10 is generic in that it works for any XOR-based erasure (RAID) code and under any combination of sector or disk failures. In a typical deployment, the data cache 70 invokes system 10 to read, write, scrub, rebuild, or migrate data stored on-one or more disks using a RAID code. Using a matrix representation of the RAID code and its physical arrangement on disks, system 10 can systematically deduce a reconstruction strategy when an application requests blocks that are lost due to failure or an update strategy when the data cache flushes dirty blocks. Furthermore, the optimizer module 210 can select a least cost strategy from the set of possible reconstruction or update strategies for every read or write, respectively. The optimizer module 210 can be configured to minimize, for example, disk I/O or memory bus usage. Another aspect of system 10 is unification of fault-free and fault-ridden code paths. By eliminating nested error code paths, system 10 qualitatively simplifies the RAID implementation.

Figure 9A:
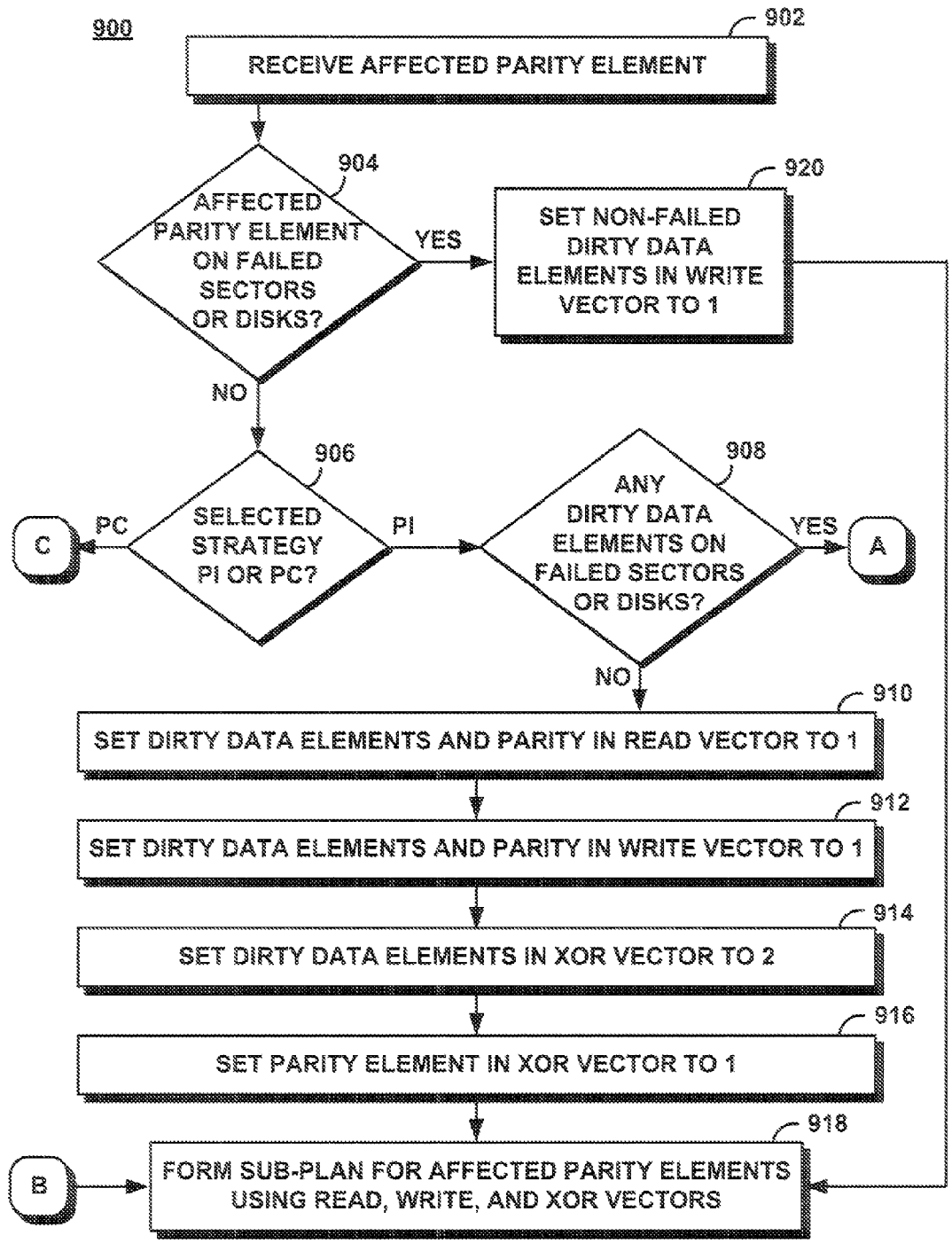
FIG. 9 is a process flow chart illustrating a method of operation of the generic RAID engine system of FIGS. 1 and 2 in generating a sub-plan.
Figure 9B:
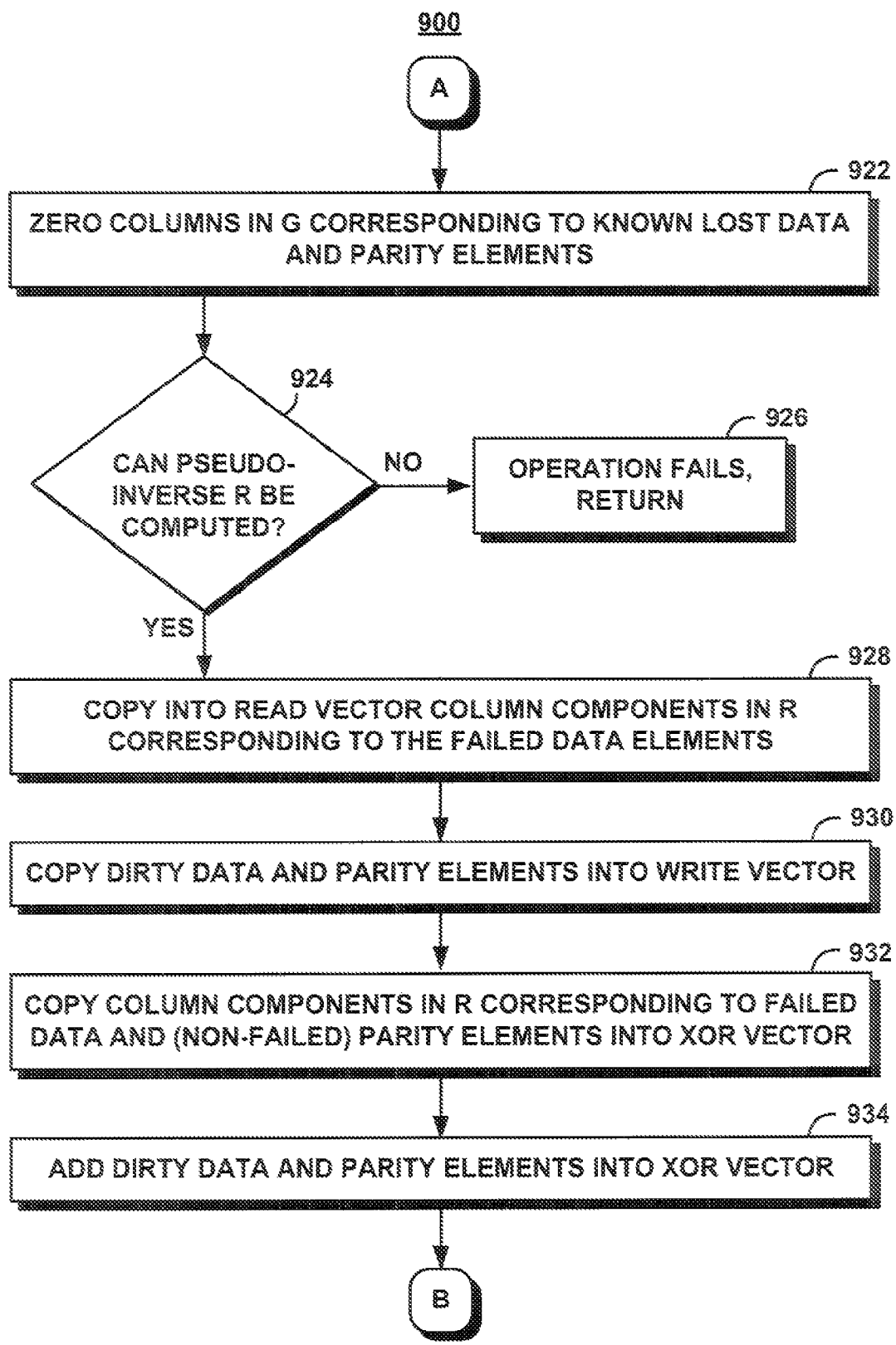
Figure 9C:
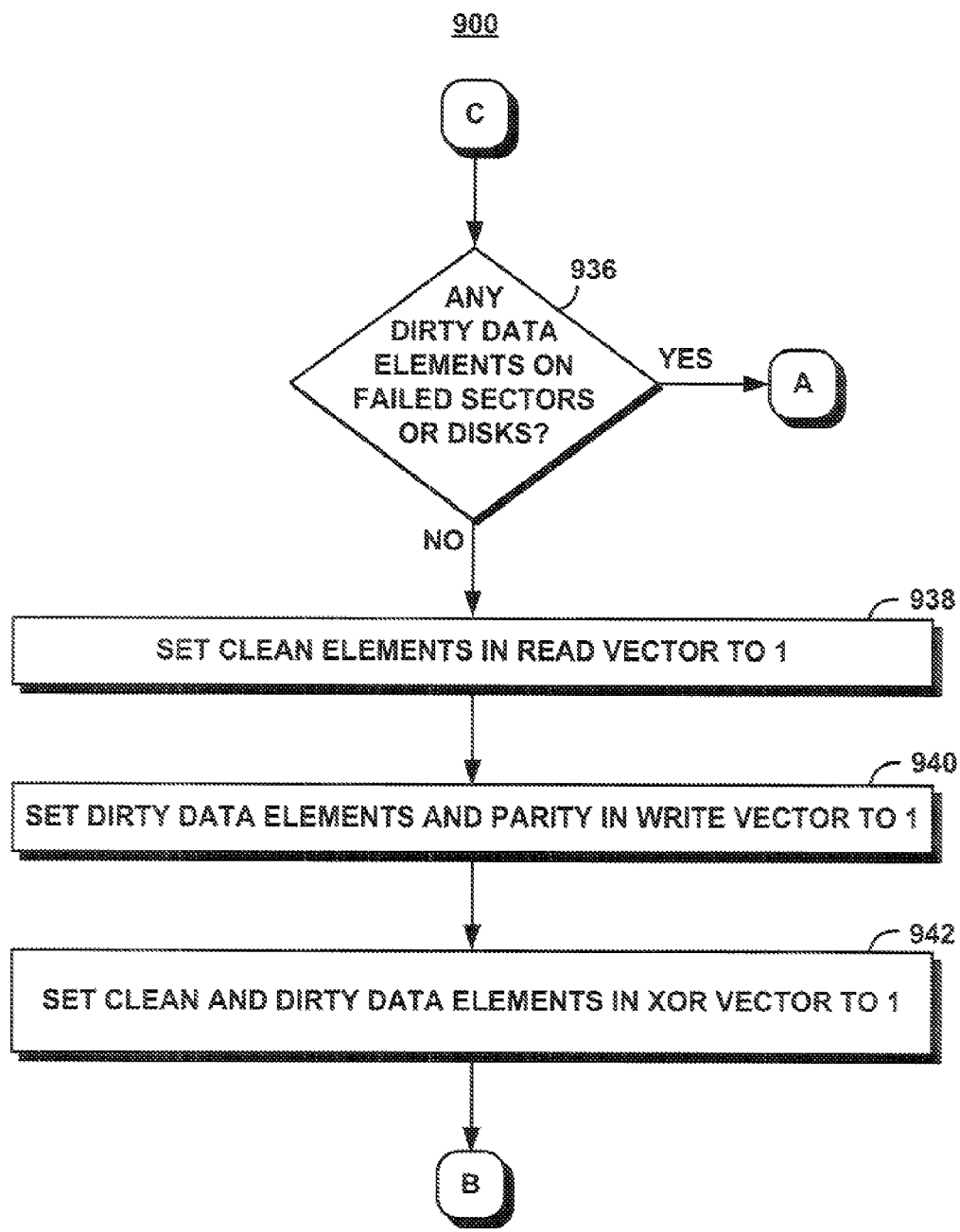

FIG. 9 illustrates a method 900 of system 10 in generating a sub-plan. System 10 receives an affected parity element (step 902). System 10 determines whether the affected parity element exists on failed sectors or disks (decision step 904). If no, system 10 determines which strategy has been selected, parity compute (PC) or parity increment (PI) (decision step 906). If parity increment, system 10 determines if any dirty data elements exist on failed sectors or disks (decision step 908). If not, system 10 sets dirty elements and parity in the read vector to 1 (step 910). System 10 sets dirty data elements and parity in the write vector to 1 (step 912). System 10 sets dirty data elements in the XOR vector to 2 (step 914). System 10 sets the parity element in the XOR vector to 2 (step 916). System 10 forms a sub-plan for the affected parity elements using the read, write, and XOR vectors (step 918).

If at decision step 908 dirty elements exist on failed sectors or disks, system 10 zeros columns in G corresponding to known lost data and parity elements (step 922). System 10 determines whether a pseudo inverse can be computed (decision step 924). If, at decision step 922 a pseudo-inverse R cannot be computed, the operation fails and system 10 returns (step 926). If yes at decision step 924, system 10 copies into the read vector column components in R corresponding to the failed data elements (step 928). System 10 copies dirty data and parity elements into the write vector (step 930). System 10 copies column components in R corresponding to failed data and (non failed) parity elements into the XOR vector (step 932). System 10 adds dirty data and parity elements into the XOR vector (step 934). System 10 proceeds to step 918 and forms a sub-plan for the affected parity elements using the read, write, and XOR vectors.

If, at decision step 906, system 10 determines that the selected strategy is parity compute, system 10 determines whether any dirty data elements exist on failed sectors or disks (decision step 935). If yes, system 10 proceeds to step 922 and performs step 922 through 934 and step 918 as previously described. If no, system 10 sets the clean elements in the read vector to 1 (step 938). System 10 sets dirty data elements and parity in the write vector to 1 (step 940). System 10 sets clean and dirty data elements in the XOR vector to 1 (step 945). System 10 proceeds to step 918 and forms a sub-plan for the affected parity elements using the read, write, and XOR vectors.

Figure 10A:
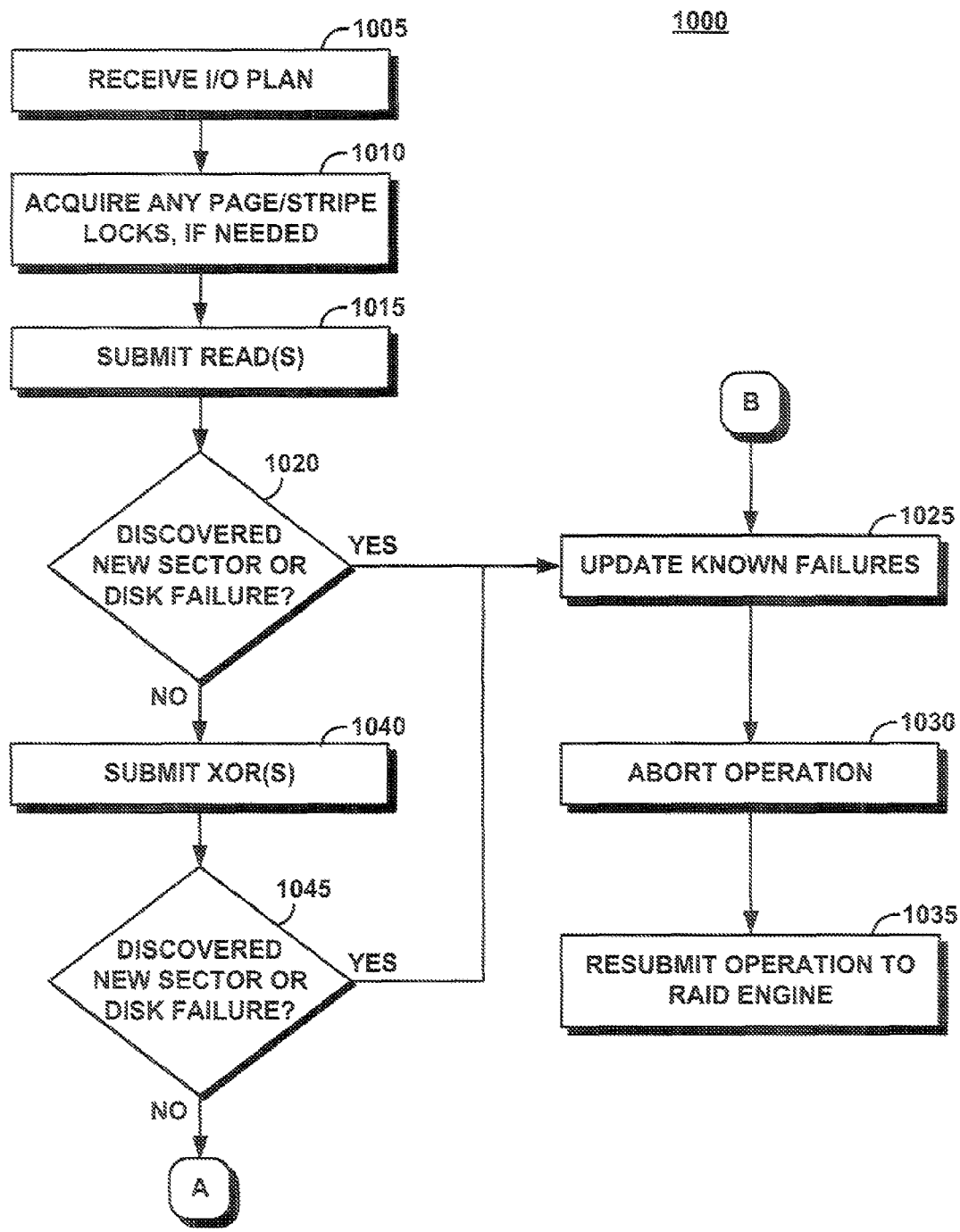
FIG. 10 is a process flow chart illustrating a method of an execution engine of the generic RAID engine system of FIGS. 1 and 2.
Figure 10B:
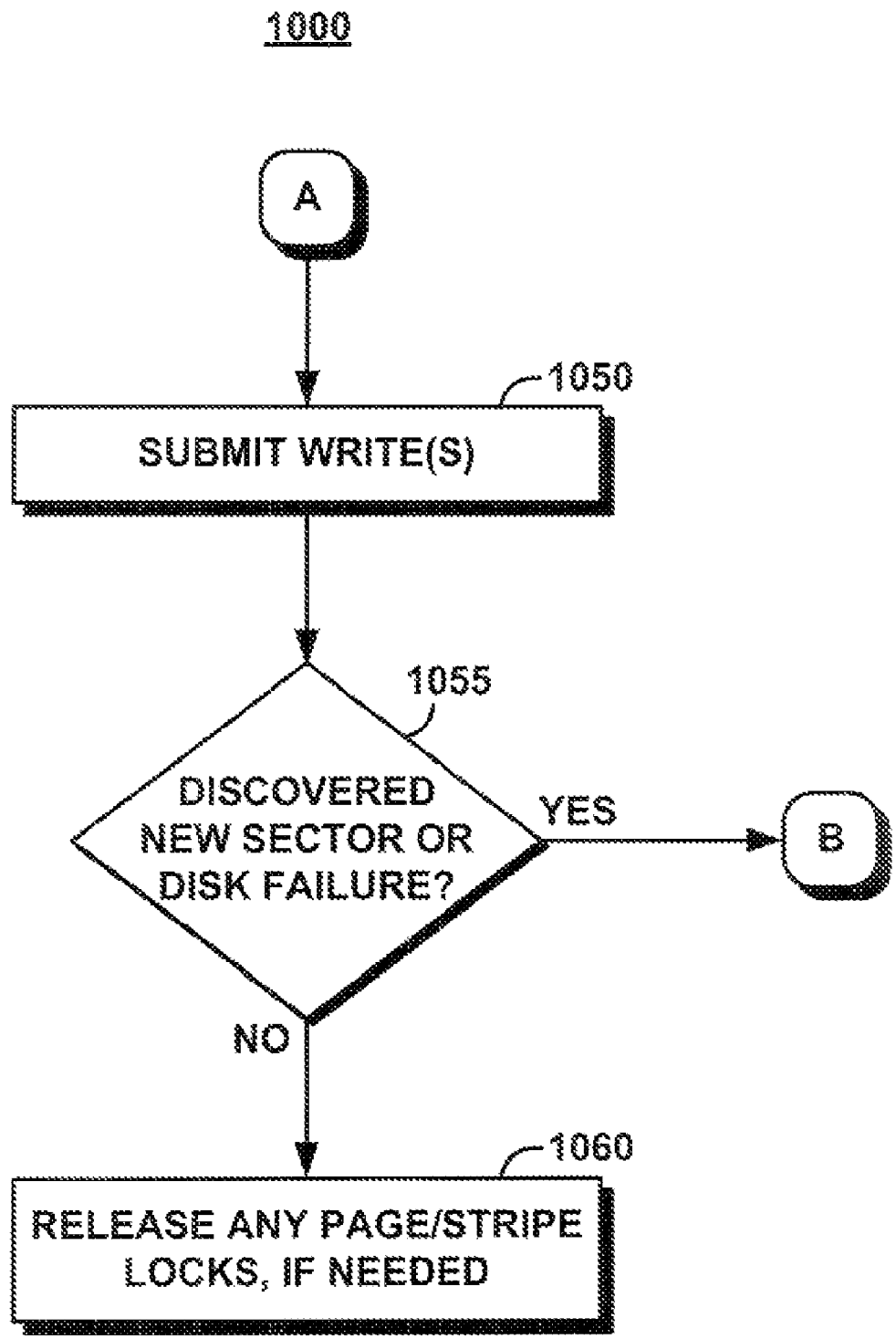

FIG. 10 illustrates a method 1000 of the execution engine 215. The execution engine 215 receives an I/O plan (step 1005). The execution engine 215 acquires any page locks or stripe locks, if needed (step 1010). The execution engine submits one or more read(s) (step 1015). The execution engine 215 determines if any new sector or disk failures have been discovered (decision step 1020). If yes, the execution engine 215 updates known failures (step 1025), aborts the operation (step 1030), and resubmits the operation to system 10 (step 1035).

If at decision step 1020 no new sector or disk failures have been discovered, the execution engine 215 submits XORs (step 1040). The execution engine 215 determines if any new sector or disk failures have been discovered (decision step 1045). If yes, the execution engine 215 performs steps 1025 through 1035, as previously described.

The execution engine 215 submits writes (step 1050). The execution engine 215 determines if any new sector or disk failures have been discovered (decision step 1055). If yes, the execution engine 215 performs steps 1025 through 1035, as previously described. The execution engine 215 releases any page locks or stripe locks, if needed (step 1060). At this point, the operation has been successfully executed by the execution engine 215.

It is to be understood that the specific embodiments of the invention that have been described are merely illustrative of certain applications of the principle of the present invention. Numerous modifications may be made to the system, method, and service for providing a generic RAID engine and optimizer described herein without departing from the spirit and scope of the present invention. Moreover, while the present invention is described for illustration purpose only in relation to RAID, it should be clear that the invention is applicable as well to, for example, any linear code or XOR based code used to achieve a virtual erasure coded storage volume.

What is claimed is:

1. A processor-implemented method of providing a RAID engine, comprising;
    accepting an access request comprising any of the following I/O operations: a read request, a write request, a file read request, a file write request, a block read request, a block write request, a stripe rebuild request, a stripe scrub request, and a stripe migrate request;
    accepting a metadata input comprising a layout description and, optionally, a plurality of resource optimization objectives;
    accepting a dynamic input comprising a dynamic state of an I/O stack comprising the RAID engine and a fault configuration of a plurality of storage devices in the I/O stack;
    accepting a generator matrix input comprising information about a RAID code used by one or more of the I/O operations;
    transforming the write request, wherein the transforming of the write request comprises:
        constructing a plurality of affected parity vectors, preparing a plurality of failure vectors as required by a degraded layout;
        computing a plurality of inverse matrices;
        generating a plurality of sub-plans by combining individual vectors, reblockinq the vectors as per the physical layout; and
        generating a write I/O plan comprising the inverse matrices for performing individual device reads, XORs and writes;
    transforming the read request, wherein the transforming of the read request comprises:
        determining if any faults exist in one or more of the storage devices that prevent a successful read, wherein if faults exist, performing the following steps:
            computing a pseudo-inverse matrix of the generator matrix input for the RAID code;
            translating the pseudo-inverse matrix for consideration to device reads and XORs; and
            generating a read I/O plan for performing individual device reads and XORs;

implementing RAID scrubbing by generating a parity check matrix based on the generator matrix input for the RAID code and utilizing the parity check matrix to ensure that all elements in the RAID code maintain the necessary RAID relationship at all times; and providing an optimizer for optimizing I/O plans for available hardware resources.

2. The method of claim 1, wherein the layout description comprises a description of a rotation, a stripe size, and an element size of each of a plurality of disks in the storage devices.

3. The method of claim 1, wherein the resource optimization objectives comprise minimizing disk I/O and minimizing memory bus bandwidth for the access request.

4. The method of claim 1, wherein the dynamic input comprises a description of a data cache of the I/O stack regarding a description of clean pages in the data cache, a description of dirty pages in the data cache, the clean pages and the dirty pages being in a W-neighborhood of a page to be any of read and written.

5. The method of claim 1, wherein the fault configuration comprises a description of a plurality of known sector failures and a plurality of known disk failures.

6. The method of claim 1, further comprising transforming the access request by any of executing a rebuild, and executing a migrate.

7. The method of claim 1, further comprising implementing a RAID migration by employing different generator matrices for each of a source target RAID layout and a target RAID layout.

8. The method of claim 1, wherein the RAID engine automatically optimizes read, write, and XOR operations necessary to complete the read, write, rebuild, scrub, and migrate operations.

9. A computer program product having a plurality of executable instruction codes stored on a computer usable storage medium, for providing a RAID engine, comprising:

a set of instruction codes for accepting an access request comprising any of the following I/O operations: a read request, a write request, a file read request, a file write request, a block read request, a block write request, a stripe rebuild request, a stripe scrub request, and a stripe migrate requests;

a set of instruction codes for accepting a metadata input comprising a layout description and, optionally, a plurality of resource optimization objectives;

a set of instruction codes for accepting a dynamic input comprising a dynamic state of an I/O stack comprising the RAID engine and a fault configuration of a plurality of storage devices in the I/O stack;

a set of instruction codes for accepting a generator matrix input comprising information about a RAID code used by an one or more of the I/O operations;

a set of instruction codes for transforming the write request, wherein the transforming of the write request comprises:

constructing a plurality of affected parity vectors, preparing a plurality of failure vectors as required by a degraded layout;

computing a plurality of inverse matrices;

generating a plurality of sub-plans by combining individual vectors, reblockinq the vectors as per the physical layout; and generating a write I/O plan comprising the inverse matrices for performing individual device reads, XORs and writes;

a set of instruction codes for transforming the read request, wherein the transforming of the read request comprises:

determining if any faults exist in one or more of the storage devices that prevent a successful read, wherein if faults exist, performing the following steps:

computing a pseudo-inverse matrix of the generator matrix input for the RAID code;

translating the pseudo-inverse matrix for consideration to device reads and XORs; and generating a read I/O plan for performing individual device reads and XORs;

a set of instruction codes for implementing RAID scrubbing by generating a parity check matrix based on the generator matrix input for the RAID code and utilizing the parity check matrix to ensure that all elements in the RAID code maintain the necessary RAID relationship at all times; and a set of instruction codes for providing an optimizer for optimizing I/O plans for available hardware resources.

10. The computer program product of claim 9, wherein the layout description comprises a description of a rotation, a stripe size, and an element size of each of a plurality of disks in the storage devices.

11. The computer program product of claim 9, wherein the resource optimization objectives comprise-minimizing disk I/O and minimizing memory bus bandwidth for the access request.

12. The computer program product of claim 9, wherein the dynamic input comprises a description of a data cache of the I/O stack regarding a description of clean pages in the data cache, a description of dirty pages in the data cache, the clean pages and the dirty pages being in a W-neighborhood of a page to be any of read and written.

13. The computer program product of claim 9, wherein the fault configuration comprises a description of a plurality of known sector failures and a plurality of known disk failures.

* * * * *